US009038103B2

(12) United States Patent
Craner

(10) Patent No.: US 9,038,103 B2
(45) Date of Patent: May 19, 2015

(54) SYSTEMS AND METHODS FOR CONTENT SURFING

(71) Applicant: Rovi Guides, Inc., Santa Clara, CA (US)

(72) Inventor: Michael Craner, Chester Springs, PA (US)

(73) Assignee: Rovi Guides, Inc., Santa Clara, CA (US)

(*) Notice: Subject to any disclaimer, the term of this patent is extended or adjusted under 35 U.S.C. 154(b) by 0 days.

(21) Appl. No.: 14/132,585

(22) Filed: Dec. 18, 2013

(65) Prior Publication Data

US 2014/0109143 A1    Apr. 17, 2014

Related U.S. Application Data

(63) Continuation of application No. 12/581,291, filed on Oct. 19, 2009, now Pat. No. 8,640,166, which is a continuation of application No. 11/430,468, filed on May 8, 2006, now abandoned.

(60) Provisional application No. 60/678,493, filed on May 6, 2005.

(51) Int. Cl.
*G06F 3/00* (2006.01)
*G06F 13/00* (2006.01)
(Continued)

(52) U.S. Cl.
CPC ............ *H04N 21/4826* (2013.01); *G06F 13/00* (2013.01); *G06F 3/00* (2013.01); *H04N 5/44591* (2013.01); *H04N 5/50* (2013.01); *H04N 21/4263* (2013.01); *H04N 21/4384* (2013.01);

(Continued)

(58) Field of Classification Search
USPC ............................ 725/37, 38, 41, 43, 52, 142
See application file for complete search history.

(56) References Cited

U.S. PATENT DOCUMENTS 3,440,427 A    4/1969   Kammer
3,492,577 A    1/1970   Reiter et al.
(Continued)

FOREIGN PATENT DOCUMENTS

CA    1196082 A1    10/1985
CA    1217269 A1    1/1987
(Continued)

OTHER PUBLICATIONS

U.S. Appl. No. 08/668,930, filed Jun. 24, 1996, Davis.
(Continued)

*Primary Examiner* — John Schnurr
(74) *Attorney, Agent, or Firm* — Ropes & Gray LLP

(57) ABSTRACT

Systems and methods for improving or suggesting alternatives to content surfing are provided. When it is detected that a user wishes to surf, a pipeline tuning sequence is implemented where by storing one or more frames of a first content selection to the user equipment and acquiring a subsequent content selection while concurrently displaying the previously stored one or more frames. Content suggestions, program listing grids, media guidance application and tuning hints, advertisements, digital audio, and live video may also be presented to user while content surfing. In some embodiments, content surf landing channels may be anticipated based on user history, user profiles, or any other suitable information. In some embodiments, thumbnails of the user's recently tuned, or paused on, content are displayed to the user while content surfing. In multiple tuner systems, more than one thumbnail may be displayed in full motion video.

16 Claims, 17 Drawing Sheets

(51) Int. Cl.
*H04N 5/445* (2011.01)
*H04N 21/482* (2011.01)
*H04N 5/50* (2006.01)
*H04N 21/426* (2011.01)
*H04N 21/438* (2011.01)
*H04N 21/442* (2011.01)
*H04N 21/45* (2011.01)
*H04N 21/488* (2011.01)

(52) U.S. Cl.
CPC ..... *H04N21/44222* (2013.01); *H04N 21/4532* (2013.01); *H04N 21/482* (2013.01); *H04N 21/4821* (2013.01); *H04N 21/4882* (2013.01)

(56) References Cited

U.S. PATENT DOCUMENTS

| | | |
|---|---|---|
| 3,493,674 A | 2/1970 | Houghton |
| 3,833,757 A | 9/1974 | Kirk, Jr. et al. |
| 3,848,193 A | 11/1974 | Martin et al. |
| 3,891,792 A | 6/1975 | Kimura |
| 3,893,049 A | 7/1975 | Bray |
| 3,936,868 A | 2/1976 | Thorpe |
| 3,956,745 A | 5/1976 | Ellis |
| 3,996,583 A | 12/1976 | Hutt et al. |
| 4,004,085 A | 1/1977 | Makino et al. |
| 4,016,361 A | 4/1977 | Pandey |
| 4,026,555 A | 5/1977 | Kirschner et al. |
| 4,031,548 A | 6/1977 | Kato et al. |
| 4,052,719 A | 10/1977 | Hutt et al. |
| 4,079,419 A | 3/1978 | Siegle et al. |
| 4,081,753 A | 3/1978 | Miller |
| 4,081,754 A | 3/1978 | Jackson |
| 4,096,524 A | 6/1978 | Scott |
| 4,134,127 A | 1/1979 | Campioni |
| 4,139,860 A | 2/1979 | Micic et al. |
| 4,150,254 A | 4/1979 | Schussler et al. |
| 4,156,198 A | 5/1979 | Heuer |
| 4,156,850 A | 5/1979 | Beyers, Jr. |
| 4,161,728 A | 7/1979 | Insam |
| 4,162,513 A | 7/1979 | Beyers, Jr. et al. |
| 4,170,782 A | 10/1979 | Miller |
| 4,186,413 A | 1/1980 | Mortimer |
| 4,189,781 A | 2/1980 | Douglas |
| 4,203,130 A | 5/1980 | Doumit et al. |
| 4,205,343 A | 5/1980 | Barrett |
| 4,218,698 A | 8/1980 | Bart et al. |
| 4,224,644 A | 9/1980 | Lewis et al. |
| 4,228,543 A | 10/1980 | Jackson |
| 4,231,031 A | 10/1980 | Crowther et al. |
| 4,233,628 A | 11/1980 | Ciciora |
| 4,249,211 A | 2/1981 | Baba et al. |
| 4,261,006 A | 4/1981 | Weintraub et al. |
| 4,264,924 A | 4/1981 | Freeman |
| 4,264,925 A | 4/1981 | Freeman et al. |
| 4,270,145 A | 5/1981 | Farina |
| 4,276,597 A | 6/1981 | Dissly et al. |
| 4,283,787 A | 8/1981 | Chambers |
| 4,288,809 A | 9/1981 | Yabe |
| 4,305,101 A | 12/1981 | Yarbrough et al. |
| 4,325,081 A | 4/1982 | Abe et al. |
| 4,329,684 A | 5/1982 | Monteath et al. |
| 4,337,480 A | 6/1982 | Bourassin et al. |
| 4,337,483 A | 6/1982 | Guillou |
| 4,338,644 A | 7/1982 | Staar |
| 4,339,798 A | 7/1982 | Hedges et al. |
| 4,344,090 A | 8/1982 | Belisomi et al. |
| 4,347,498 A | 8/1982 | Lee et al. |
| 4,355,415 A | 10/1982 | George et al. |
| 4,375,651 A | 3/1983 | Templin et al. |
| 4,381,522 A | 4/1983 | Lambert |
| 4,388,645 A | 6/1983 | Cox et al. |
| 4,390,901 A | 6/1983 | Keiser |
| 4,392,247 A | 7/1983 | van Deursen |
| 4,393,376 A | 7/1983 | Thomas |
| 4,394,691 A | 7/1983 | Amano et al. |
| 4,403,285 A | 9/1983 | Kikuchi |
| 4,405,946 A | 9/1983 | Knight |
| 4,412,244 A | 10/1983 | Shanley, II |
| 4,413,281 A | 11/1983 | Thonnart |
| 4,420,769 A | 12/1983 | Novak |
| 4,422,105 A | 12/1983 | Rodesch et al. |
| 4,425,579 A | 1/1984 | Merrell |
| 4,425,581 A | 1/1984 | Schweppe et al. |
| 4,429,385 A | 1/1984 | Cichelli et al. |
| 4,449,249 A | 5/1984 | Price |
| 4,456,925 A | 6/1984 | Skerlos et al. |
| 4,477,830 A | 10/1984 | Lindman et al. |
| 4,488,179 A | 12/1984 | Kruger et al. |
| 4,495,654 A | 1/1985 | Deiss |
| 4,496,171 A | 1/1985 | Cherry |
| 4,496,804 A | 1/1985 | Hung |
| 4,496,976 A | 1/1985 | Swanson et al. |
| 4,510,623 A | 4/1985 | Bonneau et al. |
| 4,520,404 A | 5/1985 | Von Kohorn |
| 4,527,194 A | 7/1985 | Sirazi |
| 4,531,020 A | 7/1985 | Wechselberger et al. |
| 4,535,333 A | 8/1985 | Twardowski |
| 4,536,791 A | 8/1985 | Campbell et al. |
| 4,547,804 A | 10/1985 | Greenberg |
| 4,554,584 A | 11/1985 | Elam et al. |
| 4,566,034 A | 1/1986 | Harger et al. |
| 4,573,072 A | 2/1986 | Freeman |
| 4,587,520 A | 5/1986 | Astle |
| 4,595,951 A | 6/1986 | Filliman |
| 4,595,952 A | 6/1986 | Filliman |
| 4,598,288 A | 7/1986 | Yarbrough et al. |
| 4,605,964 A | 8/1986 | Chard |
| 4,605,973 A | 8/1986 | Von Kohorn |
| 4,608,859 A | 9/1986 | Rockley |
| 4,611,269 A | 9/1986 | Suzuki et al. |
| 4,620,229 A | 10/1986 | Amano et al. |
| 4,622,545 A | 11/1986 | Atkinson |
| 4,625,080 A | 11/1986 | Scott |
| 4,626,848 A | 12/1986 | Ehlers |
| 4,635,121 A | 1/1987 | Hoffman et al. |
| 4,641,205 A | 2/1987 | Beyers, Jr. |
| 4,677,466 A | 6/1987 | Lert, Jr. et al. |
| 4,685,131 A | 8/1987 | Horne |
| 4,689,022 A | 8/1987 | Peers et al. |
| 4,691,351 A | 9/1987 | Hayashi et al. |
| 4,694,490 A | 9/1987 | Harvey et al. |
| 4,701,794 A | 10/1987 | Froling et al. |
| 4,706,121 A | 11/1987 | Young |
| 4,712,105 A | 12/1987 | Kohler |
| 4,718,107 A | 1/1988 | Hayes |
| 4,737,993 A | 4/1988 | DeVilbiss |
| 4,739,406 A | 4/1988 | Morton et al. |
| 4,746,983 A | 5/1988 | Hakamada |
| 4,750,036 A | 6/1988 | Martinez |
| 4,750,213 A | 6/1988 | Novak |
| 4,751,578 A | 6/1988 | Reiter et al. |
| 4,754,326 A | 6/1988 | Kram et al. |
| 4,768,228 A | 8/1988 | Clupper et al. |
| 4,775,935 A | 10/1988 | Yourick |
| 4,776,038 A | 10/1988 | Testin et al. |
| 4,787,063 A | 11/1988 | Muguet |
| 4,789,962 A | 12/1988 | Berry et al. |
| 4,802,114 A | 1/1989 | Sogame et al. |
| 4,807,052 A | 2/1989 | Amano et al. |
| 4,809,325 A | 2/1989 | Hayashi et al. |
| 4,812,940 A | 3/1989 | Takenaga |
| 4,821,102 A | 4/1989 | Ichikawa et al. |
| 4,821,211 A | 4/1989 | Torres |
| 4,841,132 A | 6/1989 | Kajitani et al. |
| 4,841,368 A | 6/1989 | Rumbolt et al. |
| 4,843,482 A | 6/1989 | Hegendorfer |
| 4,847,696 A | 7/1989 | Matsumoto et al. |
| 4,855,833 A | 8/1989 | Kageyama et al. |
| 4,862,268 A | 8/1989 | Campbell et al. |
| 4,868,735 A | 9/1989 | Moller et al. |
| 4,870,492 A | 9/1989 | Hakamada et al. |
| 4,873,584 A | 10/1989 | Hashimoto |
| 4,879,611 A | 11/1989 | Fukui et al. |

(56) References Cited

U.S. PATENT DOCUMENTS

| | | | |
|---|---|---|---|
| 4,885,775 A | 12/1989 | Lucas | |
| 4,888,796 A | 12/1989 | Olivo, Jr. | |
| 4,890,321 A | 12/1989 | Seth-Smith et al. | |
| 4,894,789 A | 1/1990 | Yee | |
| 4,908,707 A | 3/1990 | Kinghorn | |
| 4,908,713 A | 3/1990 | Levine | |
| 4,908,859 A | 3/1990 | Bennett et al. | |
| 4,914,516 A | 4/1990 | Duffield | |
| 4,914,517 A | 4/1990 | Duffield | |
| 4,930,158 A | 5/1990 | Vogel | |
| 4,930,160 A | 5/1990 | Vogel | |
| 4,959,719 A | 9/1990 | Strubbe et al. | |
| 4,959,720 A | 9/1990 | Duffield et al. | |
| 4,963,994 A | 10/1990 | Levine | |
| 4,965,825 A | 10/1990 | Harvey et al. | |
| 4,969,209 A | 11/1990 | Schwob | |
| 4,977,455 A | 12/1990 | Young | |
| 4,989,104 A | 1/1991 | Schulein et al. | |
| 4,991,011 A | 2/1991 | Johnson et al. | |
| 4,996,597 A | 2/1991 | Duffield | |
| 4,998,171 A | 3/1991 | Kim et al. | |
| 5,005,084 A | 4/1991 | Skinner | |
| 5,023,727 A | 6/1991 | Boyd et al. | |
| 5,027,400 A | 6/1991 | Baji et al. | |
| 5,038,211 A | 8/1991 | Hallenbeck | |
| 5,045,947 A | 9/1991 | Beery | |
| 5,047,867 A | 9/1991 | Strubbe et al. | |
| 5,068,734 A | 11/1991 | Beery | |
| 5,091,785 A | 2/1992 | Canfield et al. | |
| 5,103,314 A | 4/1992 | Keenan | |
| 5,123,046 A | 6/1992 | Levine | |
| 5,151,789 A | 9/1992 | Young | |
| 5,155,762 A | 10/1992 | Croquet et al. | |
| 5,161,023 A | 11/1992 | Keenan | |
| 5,172,111 A | 12/1992 | Olivo, Jr. | |
| 5,179,439 A | 1/1993 | Hashimoto et al. | |
| 5,179,654 A | 1/1993 | Richards et al. | |
| 5,182,646 A | 1/1993 | Keenan | |
| 5,187,589 A | 2/1993 | Kono et al. | |
| 5,193,005 A | 3/1993 | Tomita | |
| 5,193,009 A | 3/1993 | Park | |
| 5,194,941 A | 3/1993 | Grimaldi et al. | |
| 5,194,954 A | 3/1993 | Duffield | |
| 5,200,823 A | 4/1993 | Yoneda et al. | |
| 5,210,611 A | 5/1993 | Yee et al. | |
| 5,223,924 A | 6/1993 | Strubbe | |
| 5,231,493 A | 7/1993 | Apitz | |
| 5,235,415 A | 8/1993 | Bonicel et al. | |
| 5,237,411 A | 8/1993 | Fink et al. | |
| 5,237,417 A | 8/1993 | Hayashi et al. | |
| 5,251,034 A | 10/1993 | Na | |
| 5,253,066 A | 10/1993 | Vogel | |
| 5,253,067 A | 10/1993 | Chaney et al. | |
| 5,260,788 A | 11/1993 | Takano et al. | |
| 5,293,357 A | 3/1994 | Hallenbeck | |
| 5,296,931 A | 3/1994 | Na et al. | |
| 5,301,028 A | 4/1994 | Banker et al. | |
| 5,307,173 A | 4/1994 | Yuen et al. | |
| 5,317,403 A | 5/1994 | Keenan | |
| 5,323,234 A | 6/1994 | Kawasaki | |
| 5,323,240 A | 6/1994 | Amano et al. | |
| 5,335,277 A | 8/1994 | Harvey et al. | |
| 5,353,121 A | 10/1994 | Young et al. | |
| 5,355,079 A | 10/1994 | Evans et al. | |
| 5,355,162 A | 10/1994 | Yazolino et al. | |
| 5,357,276 A | 10/1994 | Banker et al. | |
| 5,359,601 A | 10/1994 | Wasilewski et al. | |
| 5,371,550 A | 12/1994 | Shibutani et al. | |
| 5,371,553 A | 12/1994 | Kawamura et al. | |
| 5,373,288 A | 12/1994 | Blahut | |
| 5,377,319 A | 12/1994 | Kitahara et al. | |
| 5,382,983 A | 1/1995 | Kwoh et al. | |
| 5,384,910 A | 1/1995 | Torres | |
| 5,390,027 A | 2/1995 | Henmi et al. | |
| 5,398,074 A | 3/1995 | Duffield et al. | |
| 5,404,393 A | 4/1995 | Remillard | |
| 5,408,692 A | 4/1995 | Suzuki et al. | |
| 5,410,326 A | 4/1995 | Goldstein | |
| 5,412,377 A | 5/1995 | Evans et al. | |
| 5,412,720 A | 5/1995 | Hoarty | |
| 5,416,895 A | 5/1995 | Anderson et al. | |
| 5,418,621 A | 5/1995 | Park | |
| 5,425,101 A | 6/1995 | Woo et al. | |
| 5,434,678 A | 7/1995 | Abecassis | |
| 5,453,796 A | 9/1995 | Duffield et al. | |
| 5,473,442 A | 12/1995 | Kim et al. | |
| 5,477,262 A | 12/1995 | Banker et al. | |
| 5,479,266 A | 12/1995 | Young et al. | |
| 5,479,268 A | 12/1995 | Young et al. | |
| 5,485,197 A | 1/1996 | Hoarty | |
| 5,485,221 A | 1/1996 | Banker et al. | |
| 5,485,518 A | 1/1996 | Hunter et al. | |
| 5,488,409 A | 1/1996 | Yuen et al. | |
| 5,502,504 A | 3/1996 | Marshall et al. | |
| 5,508,815 A | 4/1996 | Levine | |
| 5,517,254 A | 5/1996 | Monta et al. | |
| 5,523,796 A | 6/1996 | Marshall et al. | |
| 5,526,034 A | 6/1996 | Hoarty et al. | |
| 5,528,304 A | 6/1996 | Cherrick et al. | |
| 5,530,684 A | 6/1996 | Kataoka et al. | |
| 5,532,754 A | 7/1996 | Young et al. | |
| 5,541,738 A | 7/1996 | Mankovitz | |
| 5,546,521 A | 8/1996 | Martinez | |
| 5,552,833 A | 9/1996 | Henmi et al. | |
| 5,557,338 A | 9/1996 | Maze et al. | |
| 5,559,548 A | 9/1996 | Davis et al. | |
| 5,559,549 A | 9/1996 | Hendricks et al. | |
| 5,561,471 A | 10/1996 | Kim | |
| 5,579,055 A | 11/1996 | Hamilton et al. | |
| 5,583,560 A | 12/1996 | Florin et al. | |
| 5,584,525 A | 12/1996 | Nakano et al. | |
| 5,585,838 A | 12/1996 | Lawler et al. | |
| 5,585,866 A | 12/1996 | Miller et al. | |
| 5,589,892 A | 12/1996 | Knee et al. | |
| 5,592,551 A | 1/1997 | Lett et al. | |
| 5,594,509 A | 1/1997 | Florin et al. | |
| 5,596,361 A | 1/1997 | Martinez | |
| 5,596,373 A | 1/1997 | White et al. | |
| 5,596,419 A | 1/1997 | Yoshimura et al. | |
| 5,600,364 A | 2/1997 | Hendricks et al. | |
| 5,602,600 A | 2/1997 | Queinnec | |
| 5,614,940 A | 3/1997 | Cobbley et al. | |
| 5,621,456 A | 4/1997 | Florin et al. | |
| 5,623,282 A | 4/1997 | Graham et al. | |
| 5,629,733 A | 5/1997 | Youman et al. | |
| 5,635,978 A | 6/1997 | Alten et al. | |
| 5,657,414 A | 8/1997 | Lett et al. | |
| 5,659,350 A | 8/1997 | Hendricks et al. | |
| 5,659,367 A | 8/1997 | Yuen | |
| 5,673,089 A | 9/1997 | Yuen et al. | |
| 5,677,708 A | 10/1997 | Matthews, III et al. | |
| 5,682,195 A | 10/1997 | Hendricks et al. | |
| 5,684,525 A | 11/1997 | Klosterman | |
| 5,699,107 A | 12/1997 | Lawler et al. | |
| 5,727,060 A | 3/1998 | Young | |
| 5,731,844 A | 3/1998 | Rauch et al. | |
| 5,734,853 A | 3/1998 | Hendricks et al. | |
| 5,742,563 A | 4/1998 | Kataoka et al. | |
| 5,745,710 A | 4/1998 | Clanton, III et al. | |
| 5,774,887 A | 6/1998 | Wolff et al. | |
| 5,781,246 A | 7/1998 | Alten et al. | |
| 5,797,011 A | 8/1998 | Kroll et al. | |
| 5,798,785 A | 8/1998 | Hendricks et al. | |
| 5,800,768 A | 9/1998 | Kim et al. | |
| 5,801,787 A | 9/1998 | Schein et al. | |
| 5,805,763 A | 9/1998 | Lawler et al. | |
| 5,808,608 A | 9/1998 | Young et al. | |
| 5,809,204 A | 9/1998 | Young et al. | |
| 5,818,541 A | 10/1998 | Matsuura et al. | |
| 5,822,123 A | 10/1998 | Davis et al. | |
| 5,880,768 A | 3/1999 | Lemmons et al. | |
| 5,883,680 A | 3/1999 | Nykerk | |
| 5,886,746 A | 3/1999 | Yuen et al. | |
| 5,892,498 A | 4/1999 | Marshall et al. | |

(56) References Cited

U.S. PATENT DOCUMENTS

| | | |
|---|---|---|
| 5,900,916 A | 5/1999 | Pauley |
| 5,907,323 A | 5/1999 | Lawler et al. |
| 5,915,068 A | 6/1999 | Levine |
| 5,933,192 A | 8/1999 | Crosby et al. |
| 5,936,614 A | 8/1999 | An et al. |
| 5,940,073 A | 8/1999 | Klosterman et al. |
| 5,940,614 A | 8/1999 | Allen et al. |
| 5,949,954 A | 9/1999 | Young et al. |
| 5,970,206 A | 10/1999 | Yuen et al. |
| 5,986,650 A | 11/1999 | Ellis et al. |
| 5,990,927 A | 11/1999 | Hendricks et al. |
| 5,991,498 A | 11/1999 | Young |
| 6,016,108 A | 1/2000 | Terk et al. |
| 6,016,141 A | 1/2000 | Knudson et al. |
| 6,020,929 A | 2/2000 | Marshall et al. |
| 6,025,837 A | 2/2000 | Matthews, III et al. |
| 6,058,238 A | 5/2000 | Ng |
| 6,061,060 A | 5/2000 | Berry et al. |
| 6,072,535 A | 6/2000 | Kearns |
| 6,078,348 A | 6/2000 | Klosterman et al. |
| 6,141,003 A | 10/2000 | Chor et al. |
| 6,151,059 A | 11/2000 | Schein et al. |
| 6,160,989 A | 12/2000 | Hendricks et al. |
| 6,167,188 A | 12/2000 | Young et al. |
| 6,177,931 B1 | 1/2001 | Alexander et al. |
| 6,226,444 B1 | 5/2001 | Goldschmidt Iki et al. |
| 6,226,618 B1 | 5/2001 | Downs et al. |
| 6,239,794 B1 | 5/2001 | Yuen et al. |
| 6,281,940 B1 | 8/2001 | Sciammarella |
| 6,320,588 B1 | 11/2001 | Palmer et al. |
| 6,323,911 B1 | 11/2001 | Schein et al. |
| 6,324,338 B1 | 11/2001 | Wood et al. |
| 6,341,374 B2 | 1/2002 | Schein et al. |
| 6,384,869 B1 | 5/2002 | Sciammarella et al. |
| 6,388,714 B1 | 5/2002 | Schein et al. |
| 6,407,049 B1 | 6/2002 | Willey et al. |
| 6,418,556 B1 | 7/2002 | Bennington et al. |
| 6,425,129 B1* | 7/2002 | Sciammarella et al. ........ 725/38 |
| 6,430,358 B1 | 8/2002 | Yuen et al. |
| 6,445,306 B1* | 9/2002 | Trovato et al. ............. 340/12.25 |
| 6,452,620 B1 | 9/2002 | Kapushinski et al. |
| 6,470,497 B1 | 10/2002 | Ellis et al. |
| 6,473,903 B2 | 10/2002 | Balakrishnan et al. |
| 6,498,895 B2 | 12/2002 | Young et al. |
| 6,515,680 B1 | 2/2003 | Hendricks et al. |
| 6,536,041 B1 | 3/2003 | Knudson et al. |
| 6,563,515 B1 | 5/2003 | Reynolds et al. |
| 6,564,378 B1 | 5/2003 | Satterfield et al. |
| 6,614,987 B1 | 9/2003 | Ismail et al. |
| 6,637,029 B1 | 10/2003 | Maissel et al. |
| 6,651,253 B2 | 11/2003 | Dudkiewicz et al. |
| 6,661,468 B2 | 12/2003 | Alten et al. |
| 6,678,706 B1 | 1/2004 | Fishel |
| 6,744,967 B2 | 6/2004 | Kaminski et al. |
| 6,756,997 B1 | 6/2004 | Ward, III et al. |
| 6,801,262 B2 | 10/2004 | Adrain |
| 6,813,777 B1 | 11/2004 | Weinberger et al. |
| 6,832,385 B2 | 12/2004 | Young et al. |
| 6,833,878 B2 | 12/2004 | Takagi et al. |
| 6,847,778 B1 | 1/2005 | Vallone et al. |
| 6,850,691 B1 | 2/2005 | Stam et al. |
| 6,850,693 B2 | 2/2005 | Young et al. |
| 6,865,746 B1 | 3/2005 | Herrington et al. |
| 6,868,225 B1 | 3/2005 | Brown et al. |
| 6,870,573 B2 | 3/2005 | Yeo et al. |
| 6,874,152 B2 | 3/2005 | Vermeire et al. |
| 6,897,904 B2 | 5/2005 | Potrebic et al. |
| 6,898,762 B2 | 5/2005 | Ellis et al. |
| 6,906,643 B2 | 6/2005 | Samadani et al. |
| 6,934,964 B1 | 8/2005 | Schaffer et al. |
| 6,971,121 B2 | 11/2005 | West et al. |
| 6,978,310 B1 | 12/2005 | Rodriguez et al. |
| 7,002,105 B2 | 2/2006 | Suzumi |
| 7,003,791 B2 | 2/2006 | Mizutani |
| 7,007,294 B1 | 2/2006 | Kurapati |
| 7,013,478 B1 | 3/2006 | Hendricks et al. |
| 7,047,547 B2 | 5/2006 | Alten et al. |
| 7,055,166 B1 | 5/2006 | Logan et al. |
| 7,058,135 B2 | 6/2006 | Poslinski et al. |
| 7,062,777 B2 | 6/2006 | Alba et al. |
| 7,096,185 B2 | 8/2006 | Reichardt et al. |
| 7,100,185 B2 | 8/2006 | Bennington et al. |
| 7,151,886 B2 | 12/2006 | Young et al. |
| 7,165,098 B1 | 1/2007 | Boyer et al. |
| 7,187,847 B2 | 3/2007 | Young et al. |
| 7,206,892 B2 | 4/2007 | Kim et al. |
| 7,209,640 B2 | 4/2007 | Young et al. |
| 7,213,089 B2 | 5/2007 | Hatakenaka |
| 7,224,889 B2 | 5/2007 | Takasu et al. |
| 7,227,583 B2 | 6/2007 | Sin |
| 7,231,607 B2 | 6/2007 | Neely et al. |
| 7,239,356 B2 | 7/2007 | Kubota et al. |
| 7,254,823 B2 | 8/2007 | Knudson |
| 7,260,147 B2 | 8/2007 | Gordon et al. |
| 7,268,833 B2 | 9/2007 | Park et al. |
| 7,283,992 B2 | 10/2007 | Liu et al. |
| 7,296,284 B1 | 11/2007 | Price et al. |
| 7,302,112 B2 | 11/2007 | Shimazaki et al. |
| 7,313,805 B1 | 12/2007 | Rosin et al. |
| 7,334,195 B2 | 2/2008 | Gemmell et al. |
| 7,363,645 B1 | 4/2008 | Hendricks |
| 7,380,263 B2 | 5/2008 | Shintani |
| 7,386,871 B1 | 6/2008 | Knudson et al. |
| 7,458,093 B2 | 11/2008 | Dukes et al. |
| 7,460,050 B2 | 12/2008 | Alvarado et al. |
| 7,477,832 B2 | 1/2009 | Young et al. |
| 7,546,623 B2 | 6/2009 | Ramraz et al. |
| 7,603,685 B2 | 10/2009 | Knudson et al. |
| 7,610,010 B2 | 10/2009 | Onomatsu et al. |
| 7,617,511 B2 | 11/2009 | Marsh |
| 7,620,968 B2 | 11/2009 | Donnelly |
| 7,689,556 B2 | 3/2010 | Garg et al. |
| 7,738,765 B2 | 6/2010 | Matsuno et al. |
| 7,748,017 B2 | 6/2010 | Kiiskinen |
| 7,748,018 B2 | 6/2010 | Young et al. |
| 7,783,632 B2 | 8/2010 | Richardson et al. |
| 7,793,319 B2 | 9/2010 | Anderson et al. |
| 7,818,763 B2 | 10/2010 | Sie et al. |
| 7,840,112 B2 | 11/2010 | Rao |
| 7,895,193 B2 | 2/2011 | Cucerzan et al. |
| 7,974,962 B2 | 7/2011 | Krakirian et al. |
| 7,984,467 B2 | 7/2011 | Hansen-Turton |
| 7,984,468 B2 | 7/2011 | Westberg |
| 8,046,801 B2 | 10/2011 | Ellis et al. |
| 8,095,951 B1 | 1/2012 | Kunkel et al. |
| 8,127,329 B1 | 2/2012 | Kunkel et al. |
| 2001/0012439 A1 | 8/2001 | Young et al. |
| 2001/0024564 A1 | 9/2001 | Young et al. |
| 2001/0027562 A1 | 10/2001 | Schein et al. |
| 2001/0044855 A1 | 11/2001 | Vermeire et al. |
| 2001/0051037 A1 | 12/2001 | Safadi et al. |
| 2001/0052135 A1 | 12/2001 | Balakrishnan et al. |
| 2001/0053944 A1 | 12/2001 | Marks et al. |
| 2002/0016971 A1 | 2/2002 | Berezowski et al. |
| 2002/0040475 A1 | 4/2002 | Yap et al. |
| 2002/0042920 A1 | 4/2002 | Thomas et al. |
| 2002/0049973 A1 | 4/2002 | Alten et al. |
| 2002/0056098 A1 | 5/2002 | White |
| 2002/0056119 A1 | 5/2002 | Moynihan |
| 2002/0059595 A1 | 5/2002 | Goldschmidt Iki et al. |
| 2002/0059610 A1 | 5/2002 | Ellis |
| 2002/0075402 A1 | 6/2002 | Robson et al. |
| 2002/0078453 A1 | 6/2002 | Kuo |
| 2002/0104083 A1 | 8/2002 | Hendricks et al. |
| 2002/0108113 A1 | 8/2002 | Schaffer et al. |
| 2002/0113895 A1 | 8/2002 | Takagi et al. |
| 2002/0157099 A1 | 10/2002 | Schrader et al. |
| 2002/0165770 A1 | 11/2002 | Khoo et al. |
| 2002/0174430 A1 | 11/2002 | Ellis et al. |
| 2002/0175953 A1 | 11/2002 | Lin |
| 2002/0186959 A1 | 12/2002 | Young et al. |
| 2002/0194600 A1 | 12/2002 | Ellis et al. |
| 2002/0199192 A1 | 12/2002 | Donnelly |
| 2003/0013424 A1 | 1/2003 | Adrain |

(56) References Cited

U.S. PATENT DOCUMENTS

| | | |
|---|---|---|
| 2003/0018972 A1 | 1/2003 | Arora |
| 2003/0046694 A1 | 3/2003 | Istvan et al. |
| 2003/0046695 A1 | 3/2003 | Billmaier et al. |
| 2003/0066077 A1 | 4/2003 | Gutta et al. |
| 2003/0079227 A1 | 4/2003 | Knowles et al. |
| 2003/0093790 A1 | 5/2003 | Logan et al. |
| 2003/0093792 A1 | 5/2003 | Labeeb et al. |
| 2003/0093803 A1 | 5/2003 | Ishikawa et al. |
| 2003/0105589 A1 | 6/2003 | Liu et al. |
| 2003/0110499 A1 | 6/2003 | Knudson et al. |
| 2003/0110514 A1 | 6/2003 | West et al. |
| 2003/0121055 A1 | 6/2003 | Kaminski et al. |
| 2003/0122966 A1 | 7/2003 | Markman et al. |
| 2003/0142957 A1 | 7/2003 | Young et al. |
| 2003/0149621 A1 | 8/2003 | Shteyn |
| 2003/0159147 A1 | 8/2003 | Young et al. |
| 2003/0185545 A1 | 10/2003 | Young et al. |
| 2003/0192061 A1 | 10/2003 | Hwangbo et al. |
| 2003/0196201 A1 | 10/2003 | Schein et al. |
| 2003/0226145 A1 | 12/2003 | Marsh |
| 2004/0003394 A1 | 1/2004 | Ramaswamy |
| 2004/0003399 A1 | 1/2004 | Cooper |
| 2004/0008971 A1 | 1/2004 | Young et al. |
| 2004/0019908 A1 | 1/2004 | Williams et al. |
| 2004/0027485 A1 | 2/2004 | Kubota et al. |
| 2004/0030599 A1 | 2/2004 | Sie et al. |
| 2004/0064835 A1 | 4/2004 | Bellwood et al. |
| 2004/0065731 A1 | 4/2004 | Vesterling |
| 2004/0070593 A1 | 4/2004 | Neely et al. |
| 2004/0103434 A1 | 5/2004 | Ellis |
| 2004/0111741 A1 | 6/2004 | DePietro |
| 2004/0117831 A1 | 6/2004 | Ellis et al. |
| 2004/0131336 A1 | 7/2004 | Matsuno et al. |
| 2004/0133910 A1 | 7/2004 | Gordon et al. |
| 2004/0177370 A1 | 9/2004 | Dudkiewicz |
| 2004/0210926 A1 | 10/2004 | Francis et al. |
| 2004/0210932 A1 | 10/2004 | Mori et al. |
| 2004/0216160 A1 | 10/2004 | Lemmons et al. |
| 2004/0217884 A1 | 11/2004 | Samadani et al. |
| 2004/0239812 A1 | 12/2004 | Park et al. |
| 2004/0244051 A1 | 12/2004 | Kim et al. |
| 2004/0268413 A1 | 12/2004 | Reid et al. |
| 2005/0005308 A1 | 1/2005 | Logan et al. |
| 2005/0006370 A1 | 1/2005 | Suzumi |
| 2005/0010754 A1 | 1/2005 | Brendel |
| 2005/0028208 A1 | 2/2005 | Ellis et al. |
| 2005/0044567 A1 | 2/2005 | Young et al. |
| 2005/0058433 A1 | 3/2005 | Young |
| 2005/0066370 A1 | 3/2005 | Alvarado et al. |
| 2005/0080497 A1 | 4/2005 | Rao |
| 2005/0080769 A1 | 4/2005 | Gemmell et al. |
| 2005/0086693 A1 | 4/2005 | Shintani |
| 2005/0102696 A1 | 5/2005 | Westberg |
| 2005/0108754 A1 | 5/2005 | Carhart et al. |
| 2005/0114885 A1 | 5/2005 | Shikata et al. |
| 2005/0117030 A1 | 6/2005 | Kim |
| 2005/0120373 A1 | 6/2005 | Thomas et al. |
| 2005/0157217 A1 | 7/2005 | Hendricks |
| 2005/0158023 A1 | 7/2005 | Takasu et al. |
| 2005/0160461 A1 | 7/2005 | Baumgartner et al. |
| 2005/0188402 A1 | 8/2005 | de Andrade et al. |
| 2005/0204388 A1 | 9/2005 | Knudson et al. |
| 2005/0216951 A1 | 9/2005 | MacInnis |
| 2005/0229214 A1 | 10/2005 | Young et al. |
| 2005/0229215 A1 | 10/2005 | Schein et al. |
| 2005/0240967 A1 | 10/2005 | Anderson et al. |
| 2005/0246732 A1 | 11/2005 | Dudkiewicz et al. |
| 2005/0251827 A1 | 11/2005 | Ellis et al. |
| 2005/0251828 A1 | 11/2005 | Young et al. |
| 2005/0251831 A1 | 11/2005 | Young et al. |
| 2005/0251836 A1 | 11/2005 | Young et al. |
| 2005/0259963 A1 | 11/2005 | Sano et al. |
| 2006/0003693 A1 | 1/2006 | Onomatsu et al. |
| 2006/0026625 A1 | 2/2006 | Krakirian et al. |
| 2006/0026635 A1 | 2/2006 | Potrebic et al. |
| 2006/0026665 A1 | 2/2006 | Rodriguez et al. |
| 2006/0051059 A1 | 3/2006 | Krakirian et al. |
| 2006/0053449 A1 | 3/2006 | Gutta |
| 2006/0075428 A1 | 4/2006 | Farmer et al. |
| 2006/0085828 A1 | 4/2006 | Dureau et al. |
| 2006/0101490 A1 | 5/2006 | Leurs |
| 2006/0149709 A1 | 7/2006 | Krakirian et al. |
| 2006/0150214 A1 | 7/2006 | Ramraz et al. |
| 2006/0173838 A1 | 8/2006 | Garg et al. |
| 2006/0174269 A1 | 8/2006 | Hansen-Turton |
| 2006/0218573 A1 | 9/2006 | Proebstel |
| 2006/0218604 A1 | 9/2006 | Riedl et al. |
| 2006/0253874 A1 | 11/2006 | Stark et al. |
| 2006/0267995 A1 | 11/2006 | Radloff et al. |
| 2006/0271953 A1 | 11/2006 | Jacoby et al. |
| 2006/0294574 A1 | 12/2006 | Cha |
| 2007/0009229 A1 | 1/2007 | Liu |
| 2007/0016875 A1 | 1/2007 | Santos-Gomez |
| 2007/0039023 A1 | 2/2007 | Kataoka |
| 2007/0055979 A1 | 3/2007 | Van Gassel et al. |
| 2007/0055989 A1 | 3/2007 | Shanks et al. |
| 2007/0074245 A1 | 3/2007 | Nyako et al. |
| 2007/0078822 A1 | 4/2007 | Cucerzan et al. |
| 2007/0083895 A1 | 4/2007 | McCarthy et al. |
| 2007/0089132 A1 | 4/2007 | Qureshey et al. |
| 2007/0130089 A1 | 6/2007 | Chiu |
| 2007/0136749 A1 | 6/2007 | Hawkins et al. |
| 2007/0162850 A1 | 7/2007 | Adler et al. |
| 2007/0186240 A1 | 8/2007 | Ward et al. |
| 2007/0277201 A1 | 11/2007 | Wong et al. |
| 2007/0291175 A1 | 12/2007 | Hsieh |
| 2008/0066111 A1 | 3/2008 | Ellis et al. |
| 2008/0092155 A1 | 4/2008 | Ferrone et al. |
| 2008/0092156 A1 | 4/2008 | Ferrone |
| 2008/0098431 A1 | 4/2008 | Young et al. |
| 2008/0104057 A1 | 5/2008 | Billmaier et al. |
| 2008/0104127 A1 | 5/2008 | Billmaier et al. |
| 2008/0127261 A1 | 5/2008 | Ijeomah et al. |
| 2008/0184294 A1 | 7/2008 | Lemmons et al. |
| 2010/0107194 A1 | 4/2010 | McKissick et al. |
| 2010/0175086 A1 | 7/2010 | Gaydou et al. |
| 2010/0180300 A1 | 7/2010 | Carpenter et al. |
| 2010/0180302 A1 | 7/2010 | Ellis et al. |
| 2010/0325668 A1 | 12/2010 | Young et al. |
| 2011/0164861 A1 | 7/2011 | Kunkel et al. |
| 2012/0076473 A1 | 3/2012 | Kunkel et al. |
| 2012/0131616 A1 | 5/2012 | Kunkel et al. |

FOREIGN PATENT DOCUMENTS

| | | |
|---|---|---|
| DE | 2338380 A1 | 2/1975 |
| DE | 29 18 846 | 11/1980 |
| DE | 3246225 A1 | 6/1984 |
| DE | 3337204 | 4/1985 |
| DE | 3527939 | 2/1987 |
| DE | 3621263 | 1/1988 |
| DE | 3623924 | 2/1988 |
| DE | 3921847 | 1/1991 |
| DE | 4240187 | 6/1994 |
| EP | 0051228 | 5/1982 |
| EP | 0191149 A1 | 8/1986 |
| EP | 0256295 A2 | 2/1988 |
| EP | 0300562 A1 | 1/1989 |
| EP | 0337336 A2 | 10/1989 |
| EP | 0339675 | 11/1989 |
| EP | 0363653 A2 | 4/1990 |
| EP | 0393555 | 10/1990 |
| EP | 0401930 | 12/1990 |
| EP | 0408892 A1 | 1/1991 |
| EP | 0444496 | 9/1991 |
| EP | 0447968 A2 | 9/1991 |
| EP | 0472147 | 2/1992 |
| EP | 0477756 A2 | 4/1992 |
| EP | 0488379 | 6/1992 |
| EP | 0512618 A2 | 11/1992 |
| EP | 0532322 A2 | 3/1993 |
| EP | 0536901 A2 | 4/1993 |
| EP | 0548286 A1 | 6/1993 |
| EP | 0 560 593 | 9/1993 |

(56) References Cited

FOREIGN PATENT DOCUMENTS

| | | |
|---|---|---|
| EP | 0 572 090 | 12/1993 |
| EP | 0775417 A1 | 5/1997 |
| EP | 0827340 A2 | 3/1998 |
| EP | 0 836 321 | 4/1998 |
| EP | 0854645 | 7/1998 |
| EP | 0969662 A1 | 1/2000 |
| EP | 1213919 A2 | 6/2002 |
| EP | 1363452 A1 | 11/2003 |
| EP | 1377049 A1 | 1/2004 |
| EP | 1463 307 A2 | 9/2004 |
| EP | 1613066 A2 | 1/2006 |
| EP | 1641254 A2 | 3/2006 |
| EP | 1763234 A2 | 3/2007 |
| FR | 2662895 A1 | 12/1991 |
| GB | 1370535 | 10/1974 |
| GB | 1554411 | 10/1979 |
| GB | 2034995 A | 6/1980 |
| GB | 2062424 A | 5/1981 |
| GB | 2126002 A | 3/1984 |
| GB | 2155713 A | 9/1985 |
| GB | 2185670 A | 7/1987 |
| GB | 2210526 | 6/1989 |
| GB | 2217144 A | 10/1989 |
| GB | 2256546 A | 12/1992 |
| JP | 58210776 A | 12/1983 |
| JP | 59-123373 A | 7/1984 |
| JP | 59141878 A | 8/1984 |
| JP | 60061935 A | 4/1985 |
| JP | 60171685 A | 9/1985 |
| JP | 61050470 A | 3/1986 |
| JP | 61074476 A | 4/1986 |
| JP | 61109379 A | 5/1986 |
| JP | 61227486 A | 10/1986 |
| JP | 62008389 A | 1/1987 |
| JP | 62-049528 A | 3/1987 |
| JP | 62-060370 | 3/1987 |
| JP | 62-060377 A | 3/1987 |
| JP | 62060384 A | 3/1987 |
| JP | 62066493 A | 3/1987 |
| JP | 62-082325 A | 4/1987 |
| JP | 62198768 A | 9/1987 |
| JP | 63-023690 A | 1/1988 |
| JP | 63-054830 A | 3/1988 |
| JP | 63-054884 A | 3/1988 |
| JP | 63-059075 A | 3/1988 |
| JP | 63-113662 A | 5/1988 |
| JP | 63-113663 A | 5/1988 |
| JP | 63-113664 A | 5/1988 |
| JP | 63-124293 A | 5/1988 |
| JP | 63141467 A | 6/1988 |
| JP | 63-174484 A | 7/1988 |
| JP | 63247812 A | 10/1988 |
| JP | 63-289979 A | 11/1988 |
| JP | 63276069 A | 11/1988 |
| JP | 63299582 A | 12/1988 |
| JP | 64013278 U | 1/1989 |
| JP | 01-099122 A | 4/1989 |
| JP | 01-120978 A | 5/1989 |
| JP | 01-136426 A | 5/1989 |
| JP | 01-166678 A | 6/1989 |
| JP | 1142918 A | 6/1989 |
| JP | 1150928 A | 6/1989 |
| JP | 01-184691 A | 7/1989 |
| JP | 01209399 A | 8/1989 |
| JP | 1212986 A | 8/1989 |
| JP | 01213853 A | 8/1989 |
| JP | 01-276977 A | 11/1989 |
| JP | 01-306962 A | 12/1989 |
| JP | 01307944 A | 12/1989 |
| JP | 02-056791 A | 2/1990 |
| JP | 02081385 | 3/1990 |
| JP | 2113318 A | 4/1990 |
| JP | 02-117288 A | 5/1990 |
| JP | 02-119307 A | 5/1990 |
| JP | 02-146884 A | 6/1990 |
| JP | 02-176968 A | 7/1990 |
| JP | 2189753 A | 7/1990 |
| JP | 02-288571 A | 11/1990 |
| JP | 03-167975 A | 7/1991 |
| JP | 3178278 A | 8/1991 |
| JP | 03-214919 A | 9/1991 |
| JP | 03-243076 A | 10/1991 |
| JP | 04 044475 A | 2/1992 |
| JP | 04-162889 A | 6/1992 |
| JP | 04-180480 A | 6/1992 |
| JP | 05-103281 A | 4/1993 |
| JP | 05-183826 | 7/1993 |
| JP | 05-339100 A | 12/1993 |
| JP | 06-090408 A | 3/1994 |
| JP | 60-61935 A | 3/1994 |
| JP | 06069850 | 3/1994 |
| JP | 06-133235 A | 5/1994 |
| JP | 08-137334 A | 5/1996 |
| JP | 8-506469 | 7/1996 |
| JP | 08-196738 A | 8/1996 |
| JP | 10093905 | 4/1998 |
| JP | 10247344 A | 9/1998 |
| JP | 2838892 | 10/1998 |
| JP | 1078328 | 5/2009 |
| WO | WO-8700884 A1 | 2/1987 |
| WO | WO-8804507 A1 | 6/1988 |
| WO | WO-8903085 A1 | 4/1989 |
| WO | WO-9000847 A1 | 1/1990 |
| WO | WO-9007844 A1 | 7/1990 |
| WO | WO-9015507 A1 | 12/1990 |
| WO | WO-9106367 A2 | 5/1991 |
| WO | WO-9204801 A1 | 3/1992 |
| WO | WO-9304473 A2 | 3/1993 |
| WO | WO-9305452 A1 | 3/1993 |
| WO | WO-9311639 A1 | 6/1993 |
| WO | WO-9311640 A1 | 6/1993 |
| WO | WO-9323957 A1 | 11/1993 |
| WO | WO-9413107 A1 | 6/1994 |
| WO | WO-9414281 A1 | 6/1994 |
| WO | WO-9414282 A1 | 6/1994 |
| WO | WO-9414284 A1 | 6/1994 |
| WO | WO-9429811 A1 | 12/1994 |
| WO | WO-9501056 A1 | 1/1995 |
| WO | WO-9506389 A1 | 3/1995 |
| WO | WO-9532583 A1 | 11/1995 |
| WO | WO-9606605 A1 | 3/1996 |
| WO | WO-9607270 A1 | 3/1996 |
| WO | WO-9617473 A1 | 6/1996 |
| WO | WO-9619074 A1 | 6/1996 |
| WO | WO-9641478 A1 | 12/1996 |
| WO | WO-9713368 A1 | 4/1997 |
| WO | WO-9748230 A1 | 12/1997 |
| WO | WO-9749242 A1 | 12/1997 |
| WO | WO-9750251 A1 | 12/1997 |
| WO | WO-9806219 A1 | 2/1998 |
| WO | WO-9810589 A1 | 3/1998 |
| WO | WO-9826584 A1 | 6/1998 |
| WO | WO-9838831 A1 | 9/1998 |
| WO | WO-9945702 A1 | 9/1999 |
| WO | WO-0004709 A1 | 1/2000 |
| WO | WO-0011869 A1 | 3/2000 |
| WO | WO-0033573 A1 | 6/2000 |
| WO | WO-0033576 A1 | 6/2000 |
| WO | WO-0059214 A1 | 10/2000 |
| WO | WO-0176249 A1 | 10/2001 |
| WO | WO-0191458 A2 | 11/2001 |

OTHER PUBLICATIONS

U.S. Appl. No. 08/679,652, filed Jul. 11, 1996, Yuen.
U.S. Appl. No. 09/332,244, filed Jun. 11, 1999, Ellis.
U.S. Appl. No. 09/437,304, filed Nov. 9, 1999, Boyer.
U.S. Appl. No. 09/561,165, filed Apr. 28, 2000, Macrae.
U.S. Appl. No. 10/105,128, filed Feb. 21, 2002, Ellis.
U.S. Appl. No. 10/225,526, filed Aug. 20, 2002, Ellis.
U.S. Appl. No. 10/347,673, filed Jan. 17, 2003, Knudson.
U.S. Appl. No. 10/927,814, filed Aug. 26, 2004, Ellis.
U.S. Appl. No. 11/179,710, filed Jul. 12, 2005, Santos-Gomez.
U.S. Appl. No. 11/324,202, filed Dec. 29, 2005, Yates.

(56) References Cited

OTHER PUBLICATIONS

U.S. Appl. No. 11/412,549, filed Apr. 27, 2006, Ellis.
U.S. Appl. No. 11/430,516, filed May 8, 2006, Kunkel.
U.S. Appl. No. 11/431,143, filed May 8, 2006, Kunkel.
U.S. Appl. No. 11/431,128, filed May 8, 2006, Kunkel.
U.S. Appl. No. 11/431,153, May 8, 2006, Kunkel.
U.S. Appl. No. 11/431,516, filed May 11, 2006, Morimoto.
U.S. Appl. No. 11/541,299, filed Sep. 29, 2006, Shannon.
U.S. Appl. No. 12/189,386, filed Feb. 28, 2012, Kunkel.
U.S. Appl. No. 13/049,792, filed Mar. 16, 2011, Kunkel.
U.S. Appl. No. 13/310,622, filed Dec. 2, 2011, Schnurr.
U.S. Appl. No. 13/353,275, filed Jan. 18, 2012, Tawfick.
U.S. Appl. No. 60/848,600, filed Sep. 29, 2006, Ferrone.
"A New Face for Spreadsheets." PC Magazine, Dec. 22, 1987.
"Expert Report of Dr. Gary S. Tjaden," Dec. 18, 2002.
"Expert Report of Stephen D. Bristow with regard to validity of U.S. Patent Nos. 5,568,272 and 5,508,815," Jun. 10, 2002.
"JVC Instruction Book: Color TVS C-2018/C-2028/C-2038," JVC Company of America, Elmwood Park, NJ (12 pp.).
"JVC Service Manual: 20 Color TV Model C-2018 (US)," JVC Service & Engineering Company of America, No. 50082, Jan. 1988 (38 pp.).
"JVC Service Manual: 21 Color TV Model C-2018 (CA)," No. 5014, Jun. 1988 (37 pp).
"JVC Service Manual: 26 Color TV Model C-2627 (US)," JVC Service & Engineering Company of America, No. 5947, Apr. 1987 (40 pp.).
"Prevues," Prevue Guide Brochure, Spring 1984.
"Technological Examination & Basic Investigative Research Report on Image Data Bases," Japan Int'l Society for the Advancement of Image Software, Japan, Mar. 1988 (with partial translation).
"The New Media and Broadcast Policy: An Investigation & Research Conference Report on Broadcasting Diversification," Japan Ministry of Posts & Telecommunications, Mar. 1982 (with partial translation).
"Time Teletext" brochure, "Now, Through the Advances of the Computer Age, You Can Get the Information You Want, When You Want It. Instantly and Conveniently, On Your Home TV Screen," Time Inc., undated.
"TV Listings Functional Spec.," Time Video Information Services, Inc., undated.
"Using Videotex to Program Video Cassette Recorders," Broadcast Engineering Reports, vol. 26, No. 6, Nov.-Dec. 1982.
"Wire Delivery," system as described in Cable Data ad, and CableVision index vol. 7, No. 30, Apr. 5, 1982.
"Description of Digital Audio-Visual Functionalities," Digital Audio-Visual Council, DAVIC 1.3.1 Specification Part 1, Technical Report, 1998, 86 pages.
386 MAX: L'Espace Retrouve, Microsystems, May 1990 (with full English translation).
Antonoff, M., "Stay Tuned for Smart TV," Popular Science, Nov. 1990, pp. 62-65.
Baer, R.H., "Innovative Add-On TV Products," IEEE Transactions on Consumer Electronics, vol. CE-25, Nov. 1979.
Beddow, David P., "The Virtual Channels Subscriber Interface", Communications Technology, Apr. 30, 1992, pp. 30 and 49.
Bensch, U., "VPV Videotext Programs Videorecorder," IEEE Transactions on Consumer Electronics, vol. 34, No. 3, Aug. 1988, pp. 788-792.
Berniker, M., "TV Guide Going Online," Broadcasting & Cable, Jun. 13, 1994, pp. 49-52.
Bestler, C., 42nd Annual Convention & Exposition of the National Cable Television Association, Proceedings from Eleven Technical Sessions, "Flexible Data Structures and Interface Rituals for Rapid Development of OSD Applications," San Francisco, CA., Jun. 6-9, 1993, pp. 223-236.
Brugliera, Vito, "Digital On-Screen Display—A New Technology for the Consumer Interface," Symposium Record Cable Sessions of the 18th International Television Symposium & Technical Exhibition, Jun. 10, 1993, pp. 571-586.

Cable Data: Via Cable, Addressable Converters: A New Development at CableData, vol. 1, No. 12, Dec. 1981, 11 pages.
CableVision Advertisement for "TV Decisions," vol. 11, No. 38, Aug. 4, 1986.
Carne, E.B., "The Wired Household," IEEE Spectrum, vol. 16, No. 10, Oct. 1979, pp. 61-66.
Christodoulakis, S. et al., "Browsing Within Time-Driven Multimedia Documents," Conference on Office Information Systems, Palo Alto, CA., publication of the Institute for Computer Research, University of Waterloo, Waterloo, Ontario, Canada, Mar. 23-25, 1988.
Daily Variety Article "Replay to bow 'instant VCR' New digital TV recorder due in Nov. from Replay" by Paul Karon, published on Sep. 8, 1998.
Daily, M., "Addressable Decoder with Downloadable Operation," 42nd Annual Convention and Exposition of the National Cable Television Association, Proceedings from Eleven Technical Sessions, San Francisco, CA., Jun. 6-9, 1993, pp. 82-89.
Damouny, N.G., "Teletext Decoders—Keeping up with the Latest Technology Advances," IEEE Transactions on Consumer Electronics, vol. CE-30, No. 3, Aug. 1984, pp. 429-436.
Davis, B., TV Guide on Screen, "Violence on Television," House of Representatives, Committee on Energy and Commerce, Subcommittee o Telecommunications and Finance, Jun. 25, 1993, pp. 93-163.
December, J., Presenting JAVA, "Understanding the Potential of Java and the Web," © 1995 by Sams.net Publishing, pp. 1-208.
Decision of Technical Board of Appeal 3.4.2, T 1158/01-3.4.2, Jul. 13, 2004, Official Journal EPO.
Decisions of the Enlarged Board of Appeal G 2/98, Official Journal EPO, May 31, 2001.
Dip II Program Guide, systems as described in DIP II ad.
DIRECTTV Receiver with TiVO, Viewer's Guide (2000).
Eckhoff, J., "TV Listing Star on the Computer," Central Penn Business Journal/High Beam Research, Mar. 15, 1996, pp. 1-4.
Edmondson et al., "NBC Switching Central," SMPTE Journal, Oct. 1976, vol. 85, No. 10, pp. 795-805.
Edwardson, S.M. et al., "CEEFAX: A Proposed New Broadcasting Service," SMPTE Journal, Jan. 1974, vol. 83, No. 1, pp. 14-19.
Eitz et al., "Videotext Programmiert Videoheimgeräte (VPV)," Rundfunktech. Mitteilungen, vol. 30, No. 5, Sep. 11, 1986, pp. 223-229.
Hallenbeck's Cross Examination Transcript Day 7, between Gemstar-TV Guide International Inc. et al and Virgin Media Limited et al. dated Jun. 19, 2009.
Hallenbeck's Cross Examination Transcript Day 8, between Gemstar-TV Guide International Inc. et al and Virgin Media Limited et al. dated Jun. 23, 2009.
Hallenbeck's Witness Statement 1, dated Feb. 3, 2009.
Hallenbeck's Witness Statement 2, dated Feb. 13, 2009.
Hallenbeck's Witness Statement 3, dated May 6, 2009.
Hallenbeck's Witness Statement 4, dated May 11, 2009.
Hallenbeck's Witness Statements Exhibit PDH 1 "Contractual Agreement Between Systems Consultants and Triple D Incorporated," Triple D, Inc. Publishers of STV Magazine, OnSat and Satellite Retailer, May 10, 1985.
Hallenbeck's Witness Statements Exhibit PDH 10 Hallenbeck et al., "Personal Home TV Programming Guide," IEEE 1990 International Conference on Consumer Electronics, Digest of Technical Papers, Jun. 6-8, 1990.
Hallenbeck's Witness Statements Exhibit PDH 11 "Mock up of Hallenbeck's "hack" grid display" (undated).
Hallenbeck's Witness Statements Exhibit PDH 2 "SuperGuide—The Satellite Programming Guide."
Hallenbeck's Witness Statements Exhibit PDH 3 "OnSat" Canada's Weekly Guide To Satellite TV, Nov. 15-21, 1987, pp. 1-18.
Hallenbeck's Witness Statements Exhibit PDH 4 "STV A Revolutionary Product 'Electronic Publishing Comes of Age.'" by John Gurney, May 1987.
Hallenbeck's Witness Statements Exhibit PDH 5 "Come Join Us at the Largest and Most Spectacular Satellite TVRO Show in the World! SPACE/STTI Las Vegas Show '86, 'Las Vegas Convention Center, Las Vegas Nevada'" Feb. 19-21, 1986.

(56) References Cited

OTHER PUBLICATIONS

Hallenbeck's Witness Statements Exhibit PDH 6 "SPACE/STTI Nashville Show 'The Nashville Show Agenda'", Sep. 1-3, 1986 pp. 1-22.
Hallenbeck's Witness Statements Exhibit PDH 7 "Satellite Television Technology International SBCA/STTI Present Nashville!" Brochure, Jul. 9-11, 1990, vol. 2, pp. 1-36.
Hallenbeck's Witness Statements Exhibit PDH 9 "OnSat—America's Weekly Guide to Satellite TV," Jun. 10-16, 1990, pp. 1-3.
Hedger, J., "*Telesoftware: Home Computing Via Broadcast Teletext*," IEEE Transactions on Consumer Electronics, vol. CE-25, No. 3, Jul. 1979, pp. 279-287.
Heller, A., "VPS—Ein Neues System Zur Beitragsgesteuerten Programmaufzeichnung,", (translation by Lawyers and Merchants Translation Bureau, Inc.), Fundfunktechnische Mitteilungen, Issue 4, Jul. 1985 (with full English language translation).
Hofmann et al., "Videotext Programmiert Videorecorder," Rundfunktech. Mitteilungen, Sep. 17, 1982, 9 pages (with full English language translation attached).
IBM Technical Disclosure Bulletin on "Combined-User Interface for Computers, Television, Video Recorders, and Telephone, Etc.," vol. 33, No. 3B, Aug. 1990, pp. 116-118.
Insight Telecast—various publications, 1992 and 1993.
James, A., "Oracle—Broadcasting the Written Word," Wireless World, Jul. 1973, pp. 314-316.
Jerrold Communications Publication, "Cable Television Equipment," dated 1992 and 1993 pp. 8-2.1 to 8-6 and 8-14.1 to 8-14.3.
Judice, C.N. "Move Over Cable, Here Comes Video Via Voice Lines," Network World, Sep. 1, 1986, p. 26.
Karstad, K., "Microprocessor Control for Color-TV Receivers," IEEE Transactions on Consumer Electronics, vol. CE-26, No. 2, May 1980, pp. 149-155.
Kornhaas W.: "Von der Textprogrammierung über TOP zum Archivsystem" Radio Fernsehen Elektronik., vol. 40, No. 8, Aug. 30, 1991, pp. 465-468, (XP000240875 Veb Verlag Technik. Berlin, DE ISSN: 1436-1574).
Krüger, H. E., "Das Digitale Fernsehkennungssystem ZPS (Digital Video Identification System VIS)," Fernsehtechnik, vol. 35, No. 6, 1982, pp. 368-376.
Las Vegas Review—Journal/Sun "Are You Ready for New VCR Techology?" Jan. 27, 1991.
Long, M.E., "The VCR Interface", 1986 NCTA Technical Papers, pp. 197-202.
Lowenstein, R.L. et al., "The Inevitable March of Videotex," Technology Review, vol. 88, No. 7, Oct. 1985, pp. 22-29.
Mannes, G., "List-Mania, On-Screen, interactive TV guides that can program your VCR are just around the corner", Video Review, May 1992, pp. 34-36.
Mannes, G., "Smart Screens: Development for Personal Navigation Systems for TV Viewers," Video Magazine, vol. 17, No. 9, Dec. 1993.
McKenzie, G.A., "Oracle—An Information Broadcasting Service Using Data Transmission in the Vertical Interval," Journal of the SMPTE, vol. 83, No. 1, Jan. 1974, pp. 6-10.
Merrell, R.G., "Tac-Timer," 1986 NCTA Technical Papers, pp. 203-206.
Newman, Blair, "The Home Bus Standard," publication date Jul. 22, 1988.
NHK Monthly Report on Broadcast Research, "Facsimile Transmission—Various Articles," Dec. 1987, pp. 1-74 (with partial English translation attached).
Page 12 of Phillips TV 21SL5756/00B User Manual.
Pfister, Larry T., "TeleText: Its Time Has Come," Prepared for the IGC Videotex/Teletext Conference, Andover, Massachusetts, Dec. 1982.
Philips Consumer Electronics, User's Manual, Colour Television, 25GR5765, etc.
Philips TV set, model No. 25 PT 910A, User Manual, 40 pages (undated).
Printed materials on "Time's Teletext Service," 1982-1983, pp. V79175, V79142, V79143, V79148, and V79151.
Rayers, D.J., "Telesoftware by Teletext," 1984 IEEE Conf. Papers, vol. 240, 3 pages.
Re-Amended Grounds of Invalidity Under CPR Rule 17.1(2)(a), final version, served by Virgin Media dated May 13, 2009.
Roizen, Joseph, "Teletext in the USA," SMPTE Journal, Jul. 1981, pp. 602-610.
Sanyo Technical Review, "VPT System for VHS VCR," vol. 22, No. 1, Feb. 1990 (with English language abstract attached).
Satellite Service Company, "Super Guide IQ® SG 1000," User and Installation Manual , Section I-IV, undated.
Schlender, B.R., "Couch Potatoes! Now It's Smart TV," Fortune, Nov. 20, 1989, pp. 111-116.
Sealfon, Peggy, "High Tech TV," Photographic, Dec. 1984.
Sommerhäuser, W., "Video Programm System: Flexibel Programmieren mit VPS," Funkschau, No. 25, Dec. 1985, pp. 47-51.
Sugimoto, S. et al., "Computer Network: Current Status and Outlook on Leading Science and Technology," Bureau of Science & Technology (Japan),vol. 1, Dec. 1986 (with partial translation).
Sunada, K. et al. "Teletext Color Television Receiver Model C-29M950, C26M940," NEC Technical Journal, vol. 40, No. 8, Serial 216, Sep. 1987, pp. 9-21.
Symposium Record Broadcast Sessions, 14th International TV Symposium, Montreux, Switzerland, Jun. 6-12, 1985, 9 pages.
TV Guide, San Francisco Metropolitan Schedule, Feb. 6, 1989.
Uniden, UST-4800, Integrated Receiver/Descrambler, Installation Guide, © 1990, Uniden America Corporation, 60 pages.
Uniden, UST-4800, Integrated Receiver/Descrambler, Operating Guide, © 1990, Uniden America Corporation, 24 pages.
Uniden, UST-4800, Super Integrated Receiver/Descrambler, Preliminary Reference Manual, Nov. 12, 1991, 80 pages.
Universal Remote Control, Realistic—Owner's Manual, Radio Shack, 1987.
User's manual for Trinitron Colour Television model Nos. KV-A2931D, KV-A2531D and KV-A2131D, Sony Corporation, 1993.
Van Barneveld at el, "Designing Usable Interfaces for TV Recommender Systems," Personalized Digital Television, 6:259-286 (2004).
Veith R.H., "Television's Teletext," Elsevier Science Publishing Co., Inc., 1983, pp. 13-20, 41-51.
Zeisel et al., "An Interactive Menu-Driven Remote Control Unit for TV-Receivers and VC-Recorders," IEEE Transactions on Consumer Electronics, vol. 34, No. 3, Aug. 1988, pp. 814-818.
Z-TAC, Zenith Corp., undated material received from Media General.

\* cited by examiner

SYSTEMS AND METHODS FOR CONTENT SURFING

CROSS-REFERENCE TO RELATED APPLICATIONS

This application is a continuation of U.S. patent application Ser. No. 12/581,291 filed Oct. 19, 2009, which is a continuation of U.S. patent application Ser. No. 11/430,468 filed on May 8, 2006 (now abandoned), and which claims the benefit of U.S. Provisional Patent Application No. 60/678,493 filed May 6, 2005, all of which are hereby incorporated by reference herein in their entirety.

BACKGROUND OF THE INVENTION

This invention relates generally to media systems and, more particularly, to enhanced media systems that allow users to surf content.

Current media systems, including, for example, television, audio, and gaming systems, allow users to access a wide array of media content. This content may include movies, television programs, music, news, interactive applications (e.g., interactive games), Internet resources (e.g., website, newsgroups, chatrooms), and any other media content capable of being presented on user equipment. The content may be presented on hundreds of on-demand and broadcast channels, as well as from attached storage devices.

However, current media systems are susceptible to delays when navigating through the wide array of available media content. For example, a user may experience a delay of over a second when changing channels on typical user equipment, including digital and analog television equipment. As another example, a delay of several seconds is common when browsing through available content stored on a digital video recorder or attached recording device. These delays may be due, at least in part, to the time it takes the user equipment to decode the media content or broadcast stream.

To help facilitate content navigation, some media systems provide one or more interactive applications, such as an interactive media guidance application, to more easily browse the wide array of available content. The interactive media guidance application may present a grid display to the user containing media content listings. The listings may be part of a comprehensive interactive media guide, allowing the user to see what content is accessible, on what channel, and at what time.

Some users, however, may be unaware of the existence of the media guide or may prefer to surf the actual channels rather than a media guide listing. These users may become frustrated by the frequent delays associated with changing channels and accessing content. The delays are even more vexing when the user is trying to surf quickly in one direction.

Accordingly, it is desirable to provide systems and methods for accelerating content switching in media systems. The systems and methods may reduce the delays associated with content navigation by implementing a content surf sequence.

SUMMARY OF THE INVENTION

These and other objects are accomplished in accordance with the principles of the present invention by providing enhanced user equipment configured to reduce content switching delays. In one embodiment, when the user equipment detects a content surf request, one or more frames of the next content selection may be stored to the user equipment. The user equipment may then immediately tune to the content selection after the next content selection while concurrently displaying the previously stored one or more frames. This pipeline tuning sequence may be repeated for subsequent content selections until the user has terminated the content surf request.

In some embodiments, the enhanced user equipment may include more than one tuner input. In these embodiments, the tuner inputs may be involved in a round-robin pipeline tuning process, whereby the tuner inputs may take turns tuning to the next content selection in the direction of the content surf.

In some embodiments, content selections may be additionally or alternatively skipped in the direction of the content surf. For example, the user equipment may skip every N content selections, whereby N may be a user-programmable value. The user equipment may then tune to only every Nth content selection. In some of these embodiments, only the first one or more frames of the Nth selection are stored in memory on the user equipment, and a pipeline tune is implemented. The one or more frames of the Nth selection may be displayed to the user while concurrently tuning to the next (e.g., N+Nth) content selection.

The enhanced user equipment may also provide content suggestions to the user while content surfing. After a user has been content surfing for a user or system-specified period of time, a minimally-intrusive menu of content suggestions may be presented to the user. This menu may contain content listings for media that is currently (or shortly) accessible by the user equipment. In addition, the suggested content listings may be chosen based, at least in part, on user preferences, user profile data, user behavior, or user history. In addition to presenting a listing of content suggestions, each content listing in the menu may be associated with a quick dial number or link to the actual content. When a user inputs the quick dial number or selects the link, the user equipment may automatically present the corresponding content on the user equipment.

In some embodiments, hints to more efficiently navigate content are presented to the user when a user enters a content surf. The hints may include instructions on use of an interactive media guidance application or details of the search system operation. In some embodiments, the hints appear in the flip bar area or as unobtrusive overlays that do not interfere with the content surf.

In some embodiments, a stored graphic, video, or digital audio may be presented to the user while the user is content surfing. This stored content may include low resolution content stored in a circular buffer that emulates a fast tuning sequence while the user surfs to new content. In some embodiments, the user equipment may also anticipate the user's ultimate landing channel or content based on, at least in part, user preferences, user profile data, user behavior (e.g., the intensity or frequency of the up/down channeling), or user history.

The enhanced user equipment may also present advertising while the user is content surfing. Advertising may include locally-stored images, graphics, text, and video with links to purchase order forms, websites, and more information related to the product or service being advertised. Advertisements may be presented to the user in an unobtrusive manner so as to not interfere with the content surf.

In some embodiments, one or more thumbnail windows containing still frames, box art, video clip loops, or live video of one or more recently tuned channels or content may be presented to the user while content surfing. The thumbnail windows may represent a visual map of where the user has paused during the current content surf. If more than one tuner is available in the user equipment, live video of the user's most recently paused on channels or content may be presented to the user in the thumbnail windows until the user terminates the content surf. In some embodiments, a user may select any thumbnail window to return to the previously paused on content and terminate the content surf. Additionally or alternatively, a menu listing of the user's most recently paused on channels or content may be presented to the user with quick dial numbers associated with each content entry in the menu. When the user inputs a quick dial number, the corresponding content may be automatically presented to the user.

BRIEF DESCRIPTION OF THE DRAWINGS

The above and other features of the present invention, its nature and various advantages will be more apparent upon consideration of the following detailed description, taken in conjunction with the accompanying drawings, and in which.

DETAILED DESCRIPTION OF THE PREFERRED EMBODIMENTS

The systems and methods of the present invention are directed toward more efficient content surfing in media systems. Although the embodiments described below may refer to channel switching in broadcast digital or analog television systems, it is to be clearly understood that the systems and methods of the invention may be used with any suitable video or audio content (e.g., on-demand or recorded content) and in any suitable media system (e.g., satellite, on-demand, and IPTV system). As used herein, content or channel "surfing" refers to quickly progressing through a series of content selections or channels (e.g., a quick progression up or down through a number of channels whether or not those channels are contiguous).

As also used herein, the term "tune" or "tuning" refers to the preparation of acquisition of a specific content stream or content selection accessible by the user equipment. For traditional analog television systems, tuning may include acquiring or locking onto a particular channel carrier frequency. For digital television systems, tuning may include demodulating the digital carrier frequency, FEC decoding the demodulated transport stream (TS), demultiplexing the transport stream, and extracting particular packet identifier (PID) streams. For IPTV, tuning may include opening an IP socket and joining a particular multicast group. For recorded content, tuning may include locating the content on one or more storage device (e.g., by reading FAT information).

Figure 1:
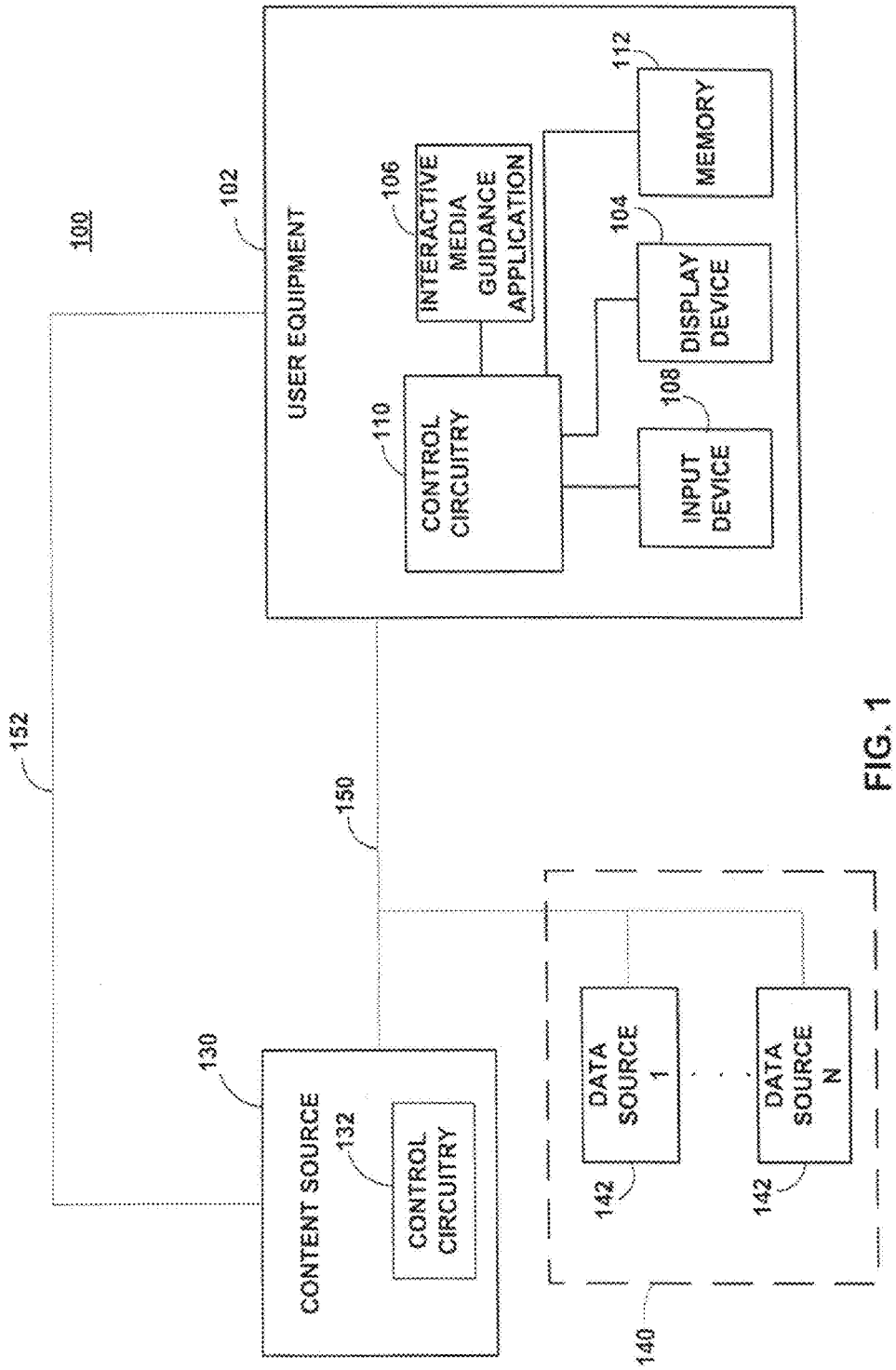
FIG. 1 is a diagram of an illustrative interactive media system in accordance with the present invention.

FIG. 1 shows illustrative interactive media system 100 in accordance with the invention. User equipment 102 may receive content in the form of signals from content source 130 and/or data sources 140 over communications paths 150 and 152, respectively. Any suitable number of users may have user equipment, such as user equipment 102, coupled to content source 130 and data sources 140. For the clarity of the figure, however, the user equipment of only a single user is shown. In addition, although in practice there may be numerous instances of content source 130, for clarity only a single content source is shown in FIG. 1.

Content source 130 may be any suitable content source such as, for example, a cable system headend, satellite television distribution facility, television broadcast facility, on-demand server (e.g., video-on-demand (VOD) server), Web server, game service provider (e.g., for local or online gaming), Internet or network access node, or any other suitable facility or system for originating or distributing passive or interactive media content to user equipment 102. Media content that may be provided by content source 130 to user equipment 102 may include broadcast television programming, VOD programming, music, news, interactive applications (e.g., interactive games), Internet resources and web services (e.g., websites, newsgroups, and chatrooms), and any other media content capable of being displayed, presented to, recorded, or interacted with, using user equipment 102.

Content source 130 and data sources 140 may be configured to transmit signals to user equipment 102 over any suitable communications paths 150 and 152, including, for example, satellite paths, fiber-optic paths, cable paths, or any other suitable wired or wireless paths. The signals may be transmitted as a broadcast, switched broadcast, multicast, unicast, or any other suitable transmission stream. Content source 130 may also include control circuitry 132 for performing operations on the signals transmitted by the content source, such as, for example, generating new signals or communicating with user equipment 102 to provide on-demand content and related functionality.

User equipment 102 may receive interactive application data from one or more of data sources 140 and content source 130. Data sources 140 may provide data for a particular type of content or for a particular application running on user equipment 102. For example, one data source 142 may provide data for an interactive media guidance application and another data source may provide data for a home shopping application. In some embodiments, data sources 140 may provide data to the applications running on user equipment 102 using a client-server model. There may be one server per data source, one server for all sources, or, in some embodiments, a single server may communicate as a proxy between user equipment 102 and various data sources 140.

Content source 130 and data sources 140 are shown in FIG. 1 as separate elements. In practice, their functionality may be combined into a single mechanism and provided from a single system at a single facility, or their functionality may be provided by multiple systems at multiple facilities. For example, content source 130 and data source 142 may be combined to provide broadcast television content and associated broadcast television data or other suitable information.

User equipment 102 may include any equipment suitable for providing an interactive media experience. For example, user equipment 102 may include computer equipment, such as a personal computer with a television card (PCTV). User equipment 102 may also include television equipment such as a television and set-top box, a recording device, a video player, a user input device (e.g., remote control, a keyboard, a mouse, a touch pad, a touch screen, and/or a voice recognition/verification module) or any other device suitable for providing a complete, interactive television experience. For example, user equipment 102 may include a DCT 2000, 2500, 5100, 6208 or 6412 set-top box provided by Motorola, Inc. In some embodiments, user equipment 102 may include a gaming system, a portable electronic device, such as a portable DVD player, a portable gaming device, a cellular telephone, a PDA, a digital music player/recorder (e.g., an MP3 player with recording capabilities), or any other suitable portable or fixed device.

In the example of FIG. 1, user equipment 102 includes at least control circuitry 110, display device 104, user input device 108, and memory 112, all of which may be implemented as separate devices or as a single, integrated device. User equipment 102 may also include interactive media guidance application 106, which, in some embodiments, may be implemented at least partially on control circuitry 110. In addition to interactive media guidance application 106, other interactive applications, such as a home banking or parental control application, may be implemented on user equipment 102. These interactive applications may be configured to direct a tuner in control circuitry 110 to display, on display device 104, various interactive application overlays and display screens and to provide various interactive application features.

Interactive media guidance application 106 may be configured to display content listings, retrieve content previews, provide content suggestions, and detect a user request to content surf. A user request to content surf may be initiated via input device 108. In some embodiments, a content surf may be affirmatively requested by the user. For example, "channel surf up" and "channel surf down" buttons may be selected on input device 108. Upon selecting either of these two buttons, the user may enter surf mode and initiate one or more content surfing sequences (described below). In other embodiments, a content surf may be initiated by interactive media guidance application 106 after some user input criteria has been met. For example, interactive media guidance application 106 may initiate a content surf on behalf of the user after the repeated selection of a traditional channel up or down button on user input device 108 for a user or system-specified period of time. A content surf may be initiated in other ways as well. For example, after pressing (and holding) a traditional channel up or down button for certain length of time, interactive media guidance application 106 may determine that the user desires to content surf. This length of time may be customized by the user or fixed by the user equipment.

In some embodiments, the rate of the content surf may be a function of the length of time the user has requested the content surf using input device 108. For example, if a user holds a channel up button on input device 108 for 5 seconds, the user equipment may content surf at a rate of 5 channels per second. As the user continues to press the channel up button on input device 108, the rate may increase proportional to the amount of the time the user holds the channel up button. In some embodiments, if the user changes the interaction with input device 108, the rate may decrease. For example, if the user switches from holding the channel up button to a repeated button selection, the rate may drop back down to 5 channels per second. In some embodiments, the number of channels to skip between tunes is affected by the user interaction with the channel up/down buttons.

Display device 104 may be any suitable device capable of presenting human-perceivable media, such as, for example, a television monitor, computer monitor, LCD display, video projection device, holographic projector, virtual reality simulator, etc. Display device 104 may also be configured to provide audio and other sensory output and may be incorporated into some device of user equipment 102 (e.g., a cellular telephone or music player display).

Control circuitry 110 is adapted to receive user input from input device 108, execute the instructions of interactive media guidance application 106, execute instructions from any other applications running on the user equipment, and direct display device 104 to display media content and interactive application display screens and overlays. Control circuitry 110 may include one or more tuners (e.g., analog or digital tuners), encoders and decoders (e.g., MPEG encoders and decoders), processors (e.g., Motorola 68000 family processors), memory, communications circuitry (e.g., cable modem and ATSC 256QAM receiver circuitry), input/output circuitry (e.g., graphics circuitry), connections to the various devices of user equipment 102 (e.g., interactive media guidance application 106 and memory 112), and any other suitable components for providing analog or digital media programming and interactive application features. In some embodiments, control circuitry 110 may be included as part of one of the devices of user equipment 102 such as, for example, part of display 104 or any other device (e.g., a set-top box, television, and/or video player).

Control circuitry 110 may be connected to memory 112 for storing data from data sources 140 or content source 130. This data may include data for use by interactive media guidance application 106 (e.g., program listings, schedules, ratings information, and related program information). Control circuitry 110 may also store user profile data, such as, for example, user viewing history data and favorite program lists, in memory 112. Control circuitry 110 may also be configured to execute the instructions of interactive media guidance application 106 from memory 112, which may include any type of storage or memory mechanism (e.g., RAM, ROM, hybrid types of memory, hard disks, and/or optical drives).

In at least some embodiments, interactive media guidance application 106 is implemented in software. However, an implementation of software and/or hardware may be used in other embodiments. These arrangements are merely illustrative. Other suitable techniques for implementing interactive media guidance application 106 may be used if desired.

Although in the illustrated embodiment of FIG. 1 interactive media guidance application 106 is internal to user equipment 102, interactive media guidance application 106 may be partially implemented externally to user equipment 102. For example, interactive media guidance application 106 may be implemented at content source 130 and may run using a client-server or distributed architecture where some of the application is implemented locally on user equipment 102 in the form of a client process and some of the application is implemented at a remote location in the form of a server process. In other embodiments, interactive media guidance application 106 may be implemented as a standalone application, subprocess, or class (e.g., in an OCAP environment). In these embodiments, the management and functionality of interactive media guidance application 106 may be invoked directly by another interactive application or the underlying operating system after some user input from input device 108.

Figure 2:
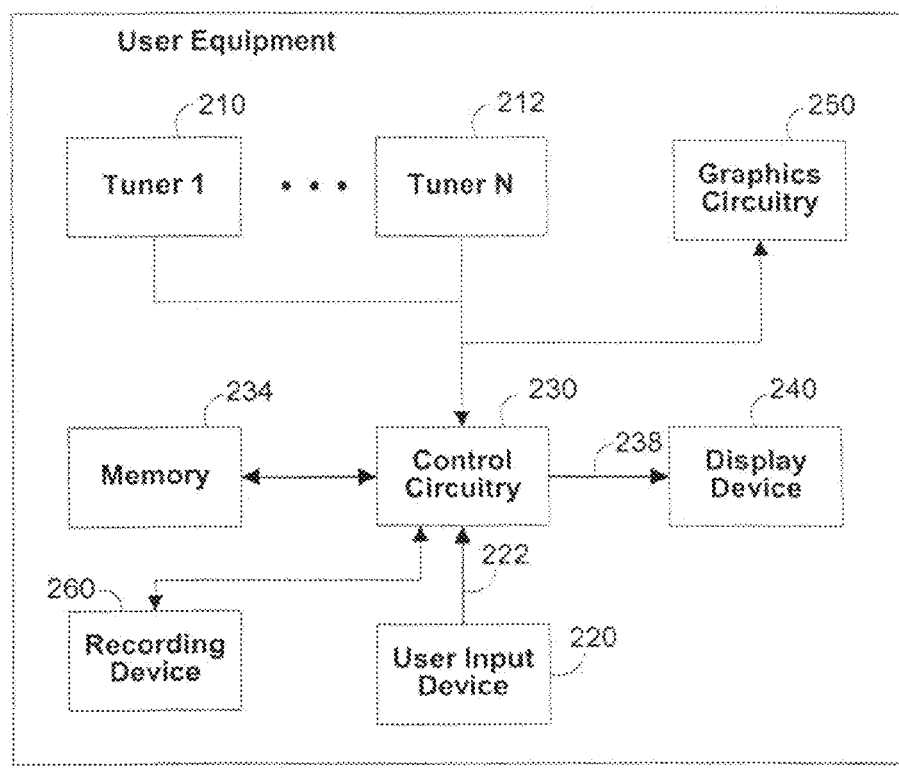
FIG. 2 is a diagram of illustrative enhanced user equipment in accordance with the present invention.

FIG. 2 shows illustrative enhanced user equipment 200 in accordance with the invention. In some embodiments, user equipment 200 may include all the functionality, connections to other parts of media system 100, and features of user equipment 102 of FIG. 1. User equipment 200 may be any in-home equipment suitable for providing interactive functionality, such as a suitably equipped television, set-top box, IPTV receiver, digital video recorder (DVR), personal video recorder (PVR), or PCTV equipment. Whatever the chosen equipment, user equipment 200 may include at least user input device 220, control circuitry 230, memory 234, recording device 260, display device 240, one or more of tuners 210 and 212, and graphics circuitry 250.

Communications path 238 may be any suitable display interface such as, for example, RGB, YPrPb, NTSC, a Digital Visual Interface (DVI) or FireWire Interface (IEEE 1394). Communications path 222 may be any suitable wired or wireless path (e.g., an infrared path).

Control circuitry 230 may include a processor, such as a microprocessor, and any other suitable circuitry for providing interactive functionality, including, for example, caching circuitry, video-decoding circuitry, direct memory access circuitry, input-output circuitry, decryption circuitry, and transcryption circuitry.

Enhanced user equipment 200 may include one or more of tuners 210 and 212. Although only two tuners are shown in the example of FIG. 2, user equipment 200 may include any suitable number of tuners. Tuners 210 and 212 may include one or more analog or digital tuners, network sockets (for IPTV systems), MPEG encoders/decoders, or other suitable audio/video circuitry. Tuners 210 and 212 may also include decoding/encoding circuitry for converting over-the-air or cable analog signals to MPEG signals for storage or for decoding digital audio and video signals. The tuning and encoding circuitry may be used by user equipment 200 to receive and display, play, or record a particular television, music, or on-demand channel or any other desired audio and video content (e.g., for requested network-based or local digital video recorder playback).

Each of tuners 210 and 212 may be coupled to control circuitry 230. Control circuitry 230 may direct tuners 210 and 212 to tune, acquire, and decode any suitable content accessible by user equipment 200. For example, tuner 210 may be an analog tuner used to acquire analog television signals, whereas tuner 212 may be a digital tuner, used to acquire and decode digital television signals. Control circuitry 230 may store or buffer one or more frames of video from tuners 210 and 212 to memory 234 at any suitable time. In addition, memory 234 may include one or more pre-stored buffers (e.g., circular buffers) of low-resolution audio or video, graphics, advertising, or any other suitable content. Control circuitry 230 may cause the stored frames, pre-stored buffer, audio, or video to be displayed or presented on display device 240 at any suitable time (e.g., after some user input from user input device 220).

User equipment 200 may also include recording device 260. Recording device 260 may include a hard drive (e.g., one or more ATA, SCSI, IDE, or IEEE 1394 drives), digital video recorder (DVR), personal video recorder (PVR), or any other device capable of storing media content. Control circuitry 230 may access stored content (e.g., programs and movies) on recording device 260 and cause the content to be presented on display device 240 at any suitable time.

In some embodiments, user equipment 200 may also include graphics circuitry 250. Graphics circuitry 250 may include video and/or audio transcoding circuitry, one or more graphics processors, memory, and various display outputs (e.g., S-Video and composite video outputs). Graphics circuitry 250 may also include video compression and scaling codecs or circuitry to scale the input from tuners 210 or 212 (or from some other device, such as recording device 260) to a resolution or size other than the input's native resolution or size. For example, using graphics circuitry 250, the input to tuners 210 and/or 212 may be displayed at a smaller size on display device 240 than their native size in order for program listings information to be presented with the tuner content on the same display screen. As another example, graphics circuitry 250 may present full-motion or still frame thumbnail windows corresponding to one or more tuner inputs on the same display screen. Graphics circuitry 250 may scale one video input at a time or scale more than one video input simultaneously. For example, the inputs of both tuners 210 and 212 may be scaled simultaneously so that these inputs may be displayed together on the same display screen in real-time (perhaps with program listings information, content suggestions, or other suitable information).

After the user affirmatively initiates a content surf or the interactive media guidance application initiates a content surf on behalf of the user (as described above), control circuitry 230 may respond by initiating one or more content surfing sequences. One content surfing sequence includes storing one or more frames of the next content to be displayed (e.g., the next channel in the direction of surfing) in memory 234 and immediately initiating a next content tune. The previously stored one or more frames may be presented on display device 240 while concurrently initiating the next content tune. In some embodiments, control circuitry 230 decodes the one or more frames before storing them to memory. In other embodiments, the one or more frames may be stored in encoded form (if supported by the underlying encoding format).

For example, for digital MPEG-2 streams, the first Intraframe ("I-frame") may be stored to memory 234. This I-frame may contain all the information needed to construct a complete frame of video. For analog signals, a full field frame may be stored in memory 234. After storing the one or more frames to memory 234, a pipeline tuning sequence may then be invoked by control circuitry 230. This pipeline tuning sequence may include immediately initiating a next content tune on one or more of tuners 210 and 212 while concurrently decoding/displaying the previously-stored content. After tuning to the next content, control circuitry 230 may again store one or more frames from the next content and immediately initiate a subsequent content tune (e.g., the subsequent channel in the direction of surfing) while displaying the newly-stored frames. This pipelined tuning process may eliminate or reduce the delays associated with content switching because only one or more frames are stored to memory 234 rather than waiting to decode an entire content stream or signal.

For example, to decode a typical MPEG-2 content stream and begin displaying it on display device 240, two I-frames are typically received. Once two I-frames are received, bi-directional predictive frames ("B-frames") may be decoded using motion-compensation prediction from both a past and future reference. Thus, the decoding delay may be a function of the time between I-frames in the MPEG-2 content stream. If a user, on average, switches to a new content stream midway during the interval between two I-frames, the stream display process may not begin until at least one and a half I-frame cycles later. Depending on various factors, such as the compression used, the I-frames cycle period may be on the order of seconds in some media systems. During this time, display screen 240 traditionally remains blank until the new stream can be successfully decoded and presented on display device 240.

By implementing a pipeline tuning sequence, if the user equipment determines that a user wishes to content surf, the user may be quickly presented with one or more frames of content per channel until the user terminates the content surf. Additionally or alternatively, other stored content, such as stored video, audio, or advertising, may be displayed while the user is content surfing. In this way, the user is presented with little or no blank screen time while surfing through content.

If user equipment 200 includes two or more tuners 210 and 212, these tuners may be involved in a round-robin pipeline tuning process. For example, if a user initiates a content surf up from channel 1, tuner 210 may briefly tune to channel 2 while control circuitry 230 stores one or more frames of content from channel 2 to memory. The next tuner in user equipment 200 (e.g., tuner 212) may immediately tune to channel 3, while tuner 210 tunes to channel 4. As each channel is briefly tuned, only one or more frames of the content are stored to the user equipment. After storing the one or more frames, control circuitry 230 may immediately initiate a next content tune. While tuning and saving the one or more frames of the next content, control circuitry 230 may simultaneously decode and display, on display device 240, the previously stored content from one or more of tuners 210 and 212.

In some embodiments, tuning may not proceed in a strictly sequential order. For example, a fixed or variable number of channels may be skipped (preferably in the direction of surfing) during a content surf. This mode may sometimes be referred to as content "skip mode" herein. Rather than tuning and displaying each channel or content in sequential order, one or more of tuners 210 and 212 may tune, decode, and display every Nth channel, whereas the value N may be user or system-selected. This process may be combined with the pipeline tuning process described above, whereby one or more frames of every Nth channel are saved to the user equipment and presented to the user, rather than decoding the entire stream. The first three steps of a simplified, illustrative example is shown below in Table 1.

TABLE 1

An illustrative pipelined skip mode surfing sequence.

| Step | Tune/Acquire | Display |
|---|---|---|
| 1 | Tune and save frame(s) of first content | |
| 2 | Tune and save frame(s) of Nth content | Display frame(s) of first content |
| 3 | Tune and save frame(s) of next content (first + N + N)th channel | Display frame(s) of Nth content |

In one embodiment, the value of N may be a function of some user interaction with the user equipment. For example, the length of time a user presses and holds a channel up or down button on user input device 220 may cause the value of N to change (e.g., increase). The number of repeated selections of a channel up or down button may also cause the value of N to change. For example, if the user continuously or repeatedly presses a channel up or down button on user input device 220 for three seconds, control circuitry 230 may cause a tuner in the user equipment to start tuning to every other content (e.g., N=2). After three more seconds of continuous or repeated pressing, control circuitry 230 may increase the value of N and tune to every fifth content (e.g., N=5), and so on. The number of seconds of repeated selection or continuous pressing to effect a change in the value of N may be defined in user preferences or a user profile (as described below in regard to FIG. 6) or by system default parameters. Interruption in the cycle or a change from a continuous press to a repeated selection may change the value of N back from 5 to 2, for example. In some embodiments, a switch from a continuous press on a channel up or down button on user input device 220 to a repeated selection is detected by control circuitry 230. In these embodiments, control circuitry 230 may enter or exit skip mode as the user changes the type of interaction (e.g., continuous press or repeated selection) with the user equipment. Note that in the case of multiple tuners, in some embodiments pipeline tune skip mode can be combined with multiple tuner pipeline tune features to improve performance further.

Figure 3:
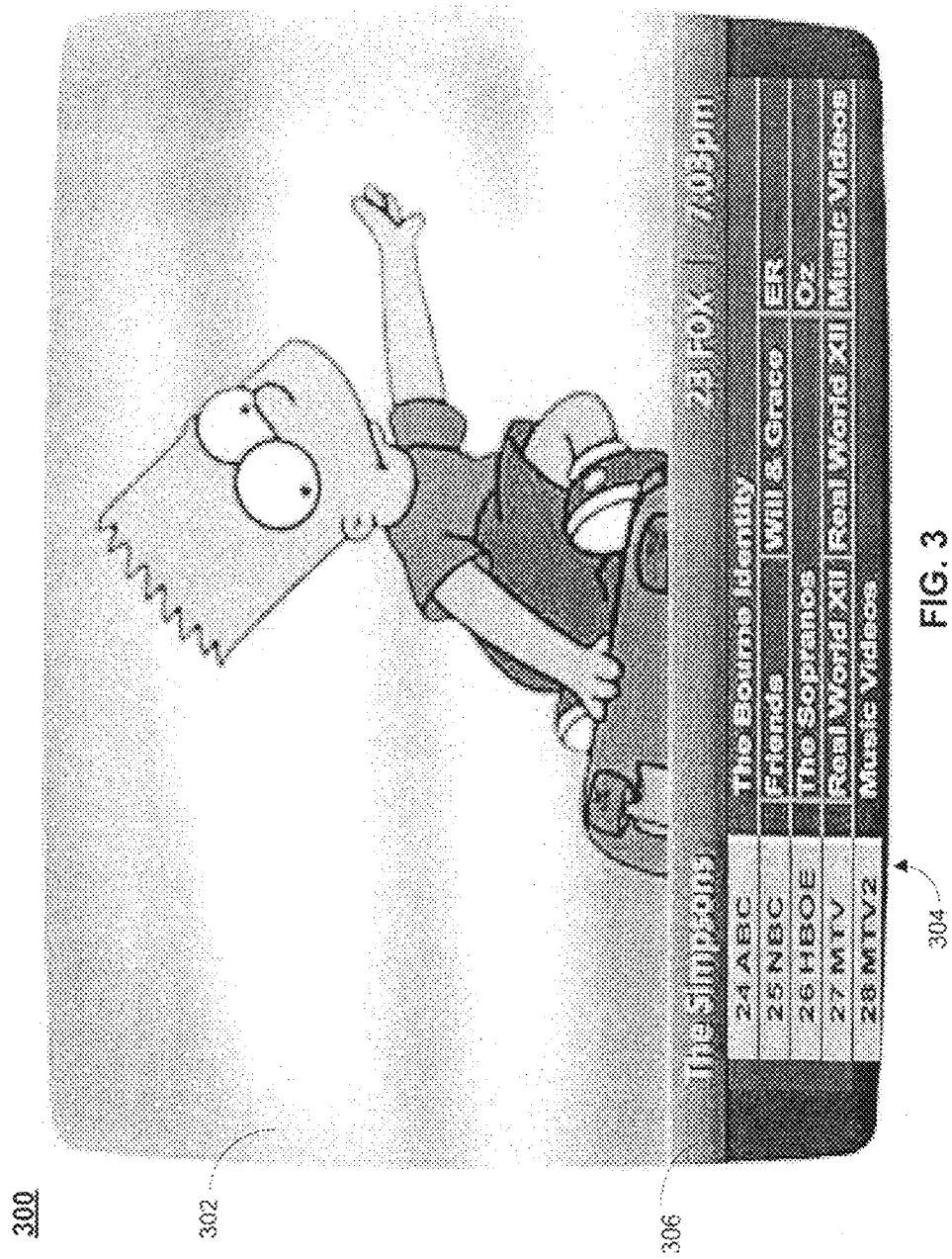
FIG. 3 shows an illustrative surf display screen with content mini-guide in accordance with the present invention.

FIG. 3 shows illustrative display screen 300 displaying mini-guide 304 during a content surf. In some embodiments, pipeline tuning (and pipeline tuning in skip mode) may be enhanced with a media guidance application content listing technique. When the interactive media guidance application detects that a user is interested in content surfing, the media guidance application may initiate a pipeline tuning sequence. As described above, while content surfing the control circuitry may display one or more stored frames of content (sequentially) in content area 302 concurrently with tuning to the next content. This process may be repeated for subsequent content (e.g., the next channel in the direction of the content surf). In some embodiments, during a content surf, a grid or table of content listings may be displayed in the flip bar area of display screen 300. This grid or table may be in presented in the form of a mini-guide, such as mini-guide 304. The content listings in mini-guide 304 may include listings associated with content ahead of the user's current progress in the content surf, so that the user may anticipate upcoming content.

In some embodiments, the interactive media guidance application may automatically scroll or update the listings in mini-guide 304 based on the user's progress in the content surf. For example, in FIG. 3, one or more frames from channel 23 may be presented in content area 302 while content listings for channels 24 through 28 are displayed in mini-guide 304. In some embodiments, after the user remains in surfing mode for some user or system-specified length of time, mini-guide 304 may include information further ahead of the user's progress in the content surf (e.g., channels 50 -55) in order to anticipate the user's surfing interests or ultimate landing channel.

Mini-guide 304 may be useful when the interactive media guidance application determines that the user may be interested in moving quickly up or down through the content selections to see what is currently being presented on each channel, but the user is either unaware or not interested in switching to the sequence that would enter the full content guide grid associated with the interactive media guidance application. When a user sees a listing of interest in mini-guide 304 ahead of the content surf, the user may terminate the content surf request at the desired position in the surf. Alternatively, the user may input a channel number displayed in mini-guide 304 to automatically terminate the content surf and be presented with the desired content.

In some embodiments, while surfing through available content, display screen 300 may include content bar 306. Content bar 306 may include any suitable program information, such as the current channel number (e.g., "23"), channel name (e.g., "FOX"), time, and content name. For example, the information in content bar 306 may related to content from channel 23 while the tuner is simultaneously acquiring and saving one or more frames of content from channel 24 (or channel 23+N, in skip mode). Thus, the information displayed in content bar 306 may correspond to the one or more frames of video currently being displayed in content area 302 (and not the content currently being tuned).

In some embodiments, while a user is surfing through content, mini-guide 304 and/or content area 302 may change from a graphical view to a display that conveys or emulates a quick channel up or channel down process. For instance, if the control circuitry determines that the user wants to surf quickly in one direction, the tuning process may be effectively bypassed and the display in content area 302 may be replaced by a graphical display that shows a quick scrolling through content or channels. The graphical display may include, for example, a blurred image that is synthesized to appear like a fast tuning process (e.g., ½ second clips of pre-stored, low-resolution content in a circular buffer). This pre-stored buffer may be displayed and the information in content bar 306 may continue to be updated to reflect the user's progress in a simulated tuning sequence. When the user terminates the content surf, the pre-stored buffer displayed in content area 302 may be replaced with content associated with a landing channel of the surf.

In some embodiments, predictive tuning may be employed. The content surf landing channel (i.e., the content the display ultimately settles on) may be anticipated by the control circuitry or the interactive media guidance application. If the landing channel is anticipated, the channel may be tuned in advance so that when the user terminates the content surf (e.g., when the user releases the channel up or channel down button), an effective "fast tune" may be accomplished. For example, if the control circuitry anticipates that a user's landing channel will be channel "27 MTV," this channel may be tuned in advance (perhaps at the start of a content surf) while the display shows buffered video from the last channel or an emulation of a fast surf. If the anticipated landing channel is not exactly the channel the user has stopped on, but within some user or system-specified range (e.g., five channels), the control circuitry may display the anticipated channel anyway. The user may then channel up and down from the landing channel to the desired channel, as usual.

Channels may be anticipated based on a variety of factors. For example, user history data may be tracked and logged to the user equipment or a network location. From this history data, the control circuitry (or an interactive application running on the control circuitry) may build a table of the most frequently-tuned channels and content and the duration of time the content was displayed on the user equipment. From this information it can derive appropriate landing channels. As another example, anticipated landing channels and content may include channels and content added to one or more favorites lists or user profiles, such as the user profile described in more detail below in regard to FIG. 6.

Figure 4:
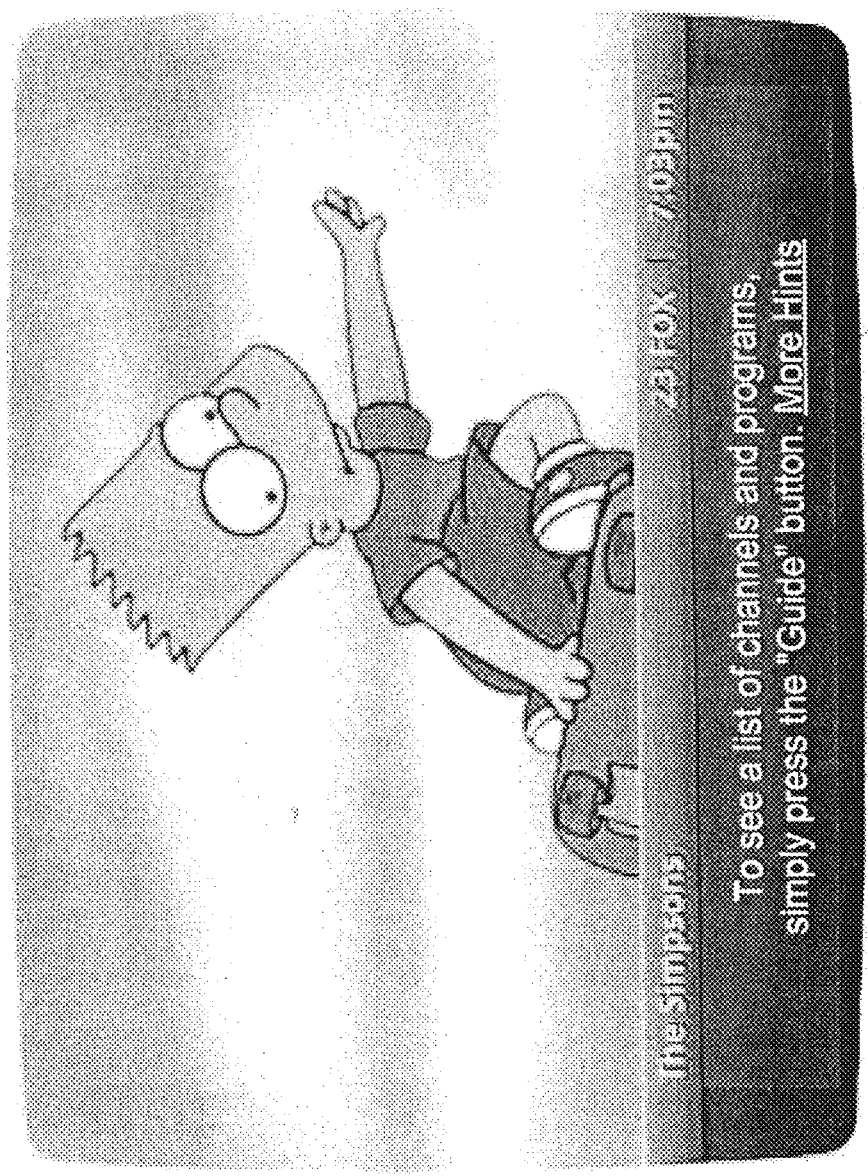
FIG. 4 shows an illustrative surf display screen with content navigation hints in accordance with the present invention.

In some embodiments, hints may be presented to the user while content surfing. For example, as shown in FIG. 4, display screen 400 may show hint 402 to the user. This embodiment may be helpful in teaching the user how to effectively use the interactive media guidance application by providing guidance suggestions. These suggestions may include any suitable instruction related to content changing, content surfing, ways to find content quicker, details of the search system operation, or the use of an interactive media guidance application. As shown in the example of FIG. 4, hint 402 may include "to see a list of the channels and programs, simply press the GUIDE button" and other similar suggestions. To view more hints, the user may select "more hints" selection 404 using any available input device. Alternatively or additionally, hints may be automatically displayed by pressing a suitable button while content surfing (e.g., a "hints" button) on a user input device.

Figure 5:
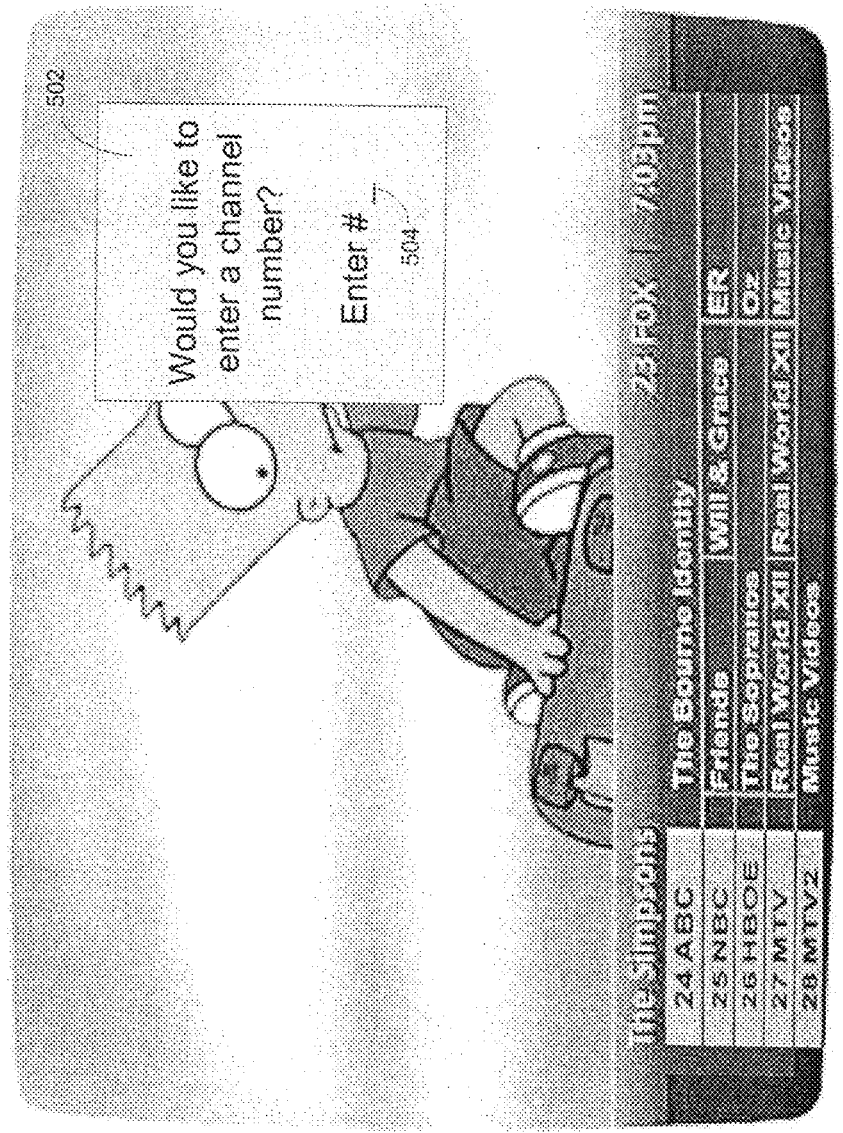
FIG. 5 shows an illustrative surf display screen with a channel number prompt in accordance with the present invention.

In some embodiments, the interactive media guidance application may also present a content selection menu or overlay to the user while content surfing. For example, FIG. 5 shows display screen 500 with content selection overlay 502. After the interactive media guidance application determines that the user has been content surfing for some user or system-specified length of time, content selection overlay 502 may be displayed to the user. Content selection overlay 502 may ask the user to enter a channel number. Content selection overlay 502 may not interfere with the content surfing sequence, but merely provide an alternative method for accessing the content that the user wishes to access. Content selection overlay 502 may include channel entry area 504. The user may enter a channel number into channel entry 504 using any available input device, including input device 108 (FIG. 1). Upon entering a valid channel number, the user equipment may tune directly to the selected channel.

Figure 6:
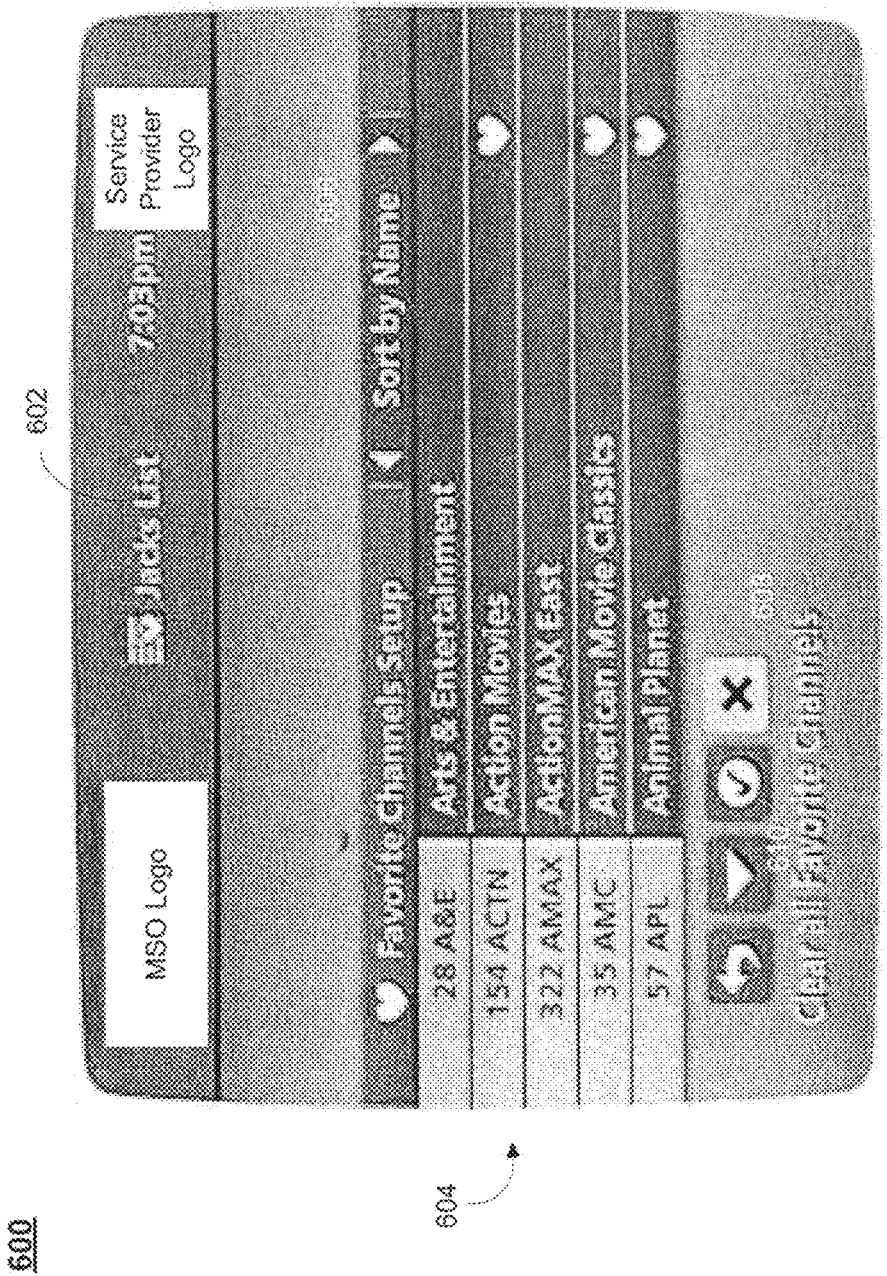
FIG. 6 shows an illustrative user favorite channels surf display screen in accordance with the present invention.
Figure 7:
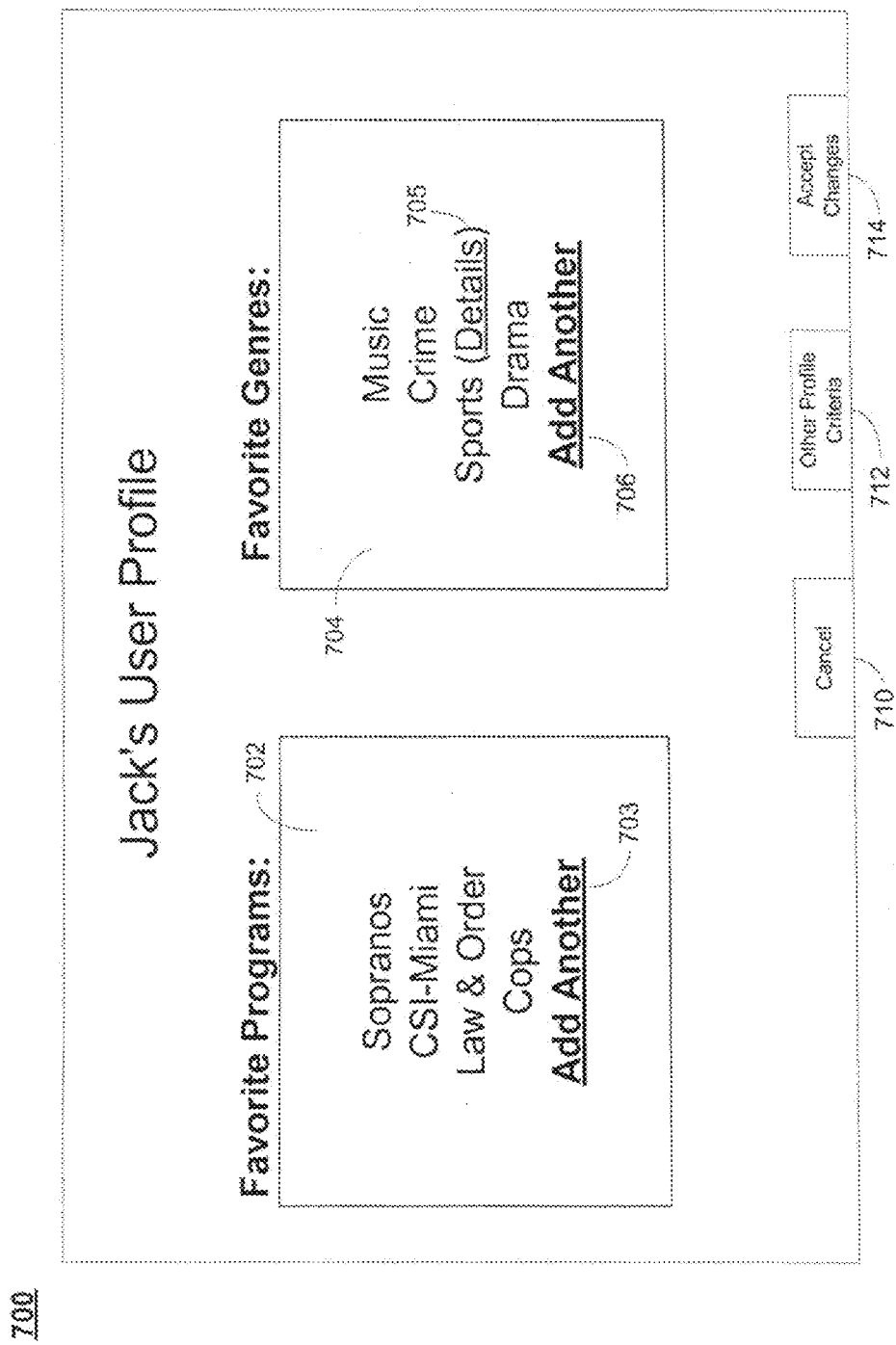
FIG. 7 shows an illustrative user profile display screen in accordance with the present invention.

The interactive media guidance application may also provide content suggestions. Whereas content selection menus and overlays merely provide the user an alternate method for accessing content, content suggestions provide tailored listings of content that the user equipment determines that the user may be interested in watching. Content suggestions are based, at least in part, on user preferences, user profile data, user behavior (including recent surfing or scanning behavior, as well as dwell time and surf interaction responses to content previously surfed), or user history. As used herein, "user profile data" explicitly includes user preferences, user behavior data, and user history data. For example, FIG. 6 shows an illustrative favorite channels display screen and FIG. 7 shows an illustrative user profile display screen. Both of these display screens may create and/or update user profile data, which may be saved to the user equipment (or a network location such as content source 130 of FIG. 1) and used to suggest content to the user. Each user accessing the user equipment may have a personal favorite channels list and/or user profile, or there may be a single favorite channels list and/or user profile list for all users accessing the user equipment.

Favorite channels display screen 600 may include at least list name 602 and favorite channels list 604. If multiple favorite channels lists are used in a single system, each list may be given a unique identifier (e.g., name) for list name 602. A user may add and remove channels to favorite channels list 604 in a variety of ways. For example, the user may press a "Favorites" button on user input device 220 (FIG. 2) to automatically add the channel currently being presented on display device 240 to favorite channels list 604. Users may also add channels directly from favorite channels display screen 600, if desired. To add a new favorite channel directly from favorite channels display screen 600, the interactive media guidance application may present a listing of available channels to the user (not shown). This listing may be derived, at least in part, from interactive media guidance application data. The user may select any channel from the listing of available channels and press a "Favorites" button on user input device 220 (FIG. 2).

For ease of navigation, favorite channels list 604 may be sorted by channel name or channel number. Upon selecting sort option 606, the sort order may be toggled. To remove channels from favorite channels list 604, the user may select delete button 608 while selecting an entry in favorite channels list 604. In some embodiments, the channels in favorite channels list 604 may be pre-populated with the user's most frequently or recently accessed channels. The user may then customize the list using favorite channels display screen 600, if desired.

Upon selecting accept changes button 610, the interactive media guidance application may create or update the user's favorite channels in favorite channels list 604 to memory 234 (FIG. 2). The channels list may be saved in any convenient manner, such as, for example, as a file or a table in a relational database. If the user equipment supports multiple favorite channel lists, then the list may also be associated with the current user.

To further customize a user's content preferences, the user may create or update a user profile. As shown in FIG. 7, user profiles may include user content preferences, such as, for example, favorite programs list 702 and favorite genre list 704. A user may be presented with user profile creation display screen 700 in number of ways. For example, a user may press a suitable button on input device 220 of FIG. 2 (e.g., a "Profiles" button). A user may also be linked to user profile display screen 700 from another interactive application display screen.

The user may add, remove, or reorder any of the entries in lists 702 and 704. In favorite programs list 702, the user may define a list of the user's favorite programs accessible by the user equipment. Upon selecting add another link 703, interactive media guidance application data may be accessed to present a list of all available content (e.g., broadcast television programs, on-demand content, and recorded content) to the user (not shown). The user may then select the user's favorite programs for inclusion into favorite programs list 702. In some embodiments, favorite programs list 702 may be pre-populated with the user's most frequently or recently accessed programs.

Similarly, the user may add, remove, or reorder content genres in favorite genre list 704. The list of genres in favorite genre list 704 may also be pre-populated with the genres of the user's most frequently or recently accessed content. In the example of FIG. 7, the genres "music," "crime," "sports," and "drama" are included in the user's favorite genre list. To add another genre, the user may select add another link 706. Upon selecting add another link 706, the interactive media guidance application data may link to interactive media guidance application data to present a list of available genres (not shown) to the user. The user may select one or more genres in the list for inclusion in favorite genres list 704. In some embodiments, in order to determine the genre of content, the interactive media guidance application may access extended content information from a suitable data source (e.g., data source 142 of FIG. 1). In other embodiments, genre information may be available as part of standard interactive media guidance application data.

Some genres may be associated with genre details used to further define the genre. For example, if the sports genre is added to favorite genre list 704, the user may additionally select to set up genre details by selecting details link 705. Upon selecting details link 705 genre detail display screen 800 (FIG. 8) may be presented to the user.

The lists in profile display screen 700 may be ordered or unordered. If the user desires to create an unordered list, each entry in the list may be assigned the same weight, or rank. If one or more of the lists is ordered, then weights may be assigned to each entry in the list based on its placement in the list. For example, a program listed in the first slot in favorite programs list 702 may be assigned a higher weight, or rank, than programs in lower slots in favorite programs list 702. In this way, a user may prioritize content within the same list.

To discard profile display screen without saving changes, the user may select cancel button 710. To accept the changes as displayed in user profile display screen 700, the user may select accept changes button 714. Upon selecting accept changes button 714, the user's profile data may be created or updated. In some embodiments, user profile data is updated and stored in memory (e.g., in a file or table in a relational database in memory 234 of FIG. 2) on the user equipment. In other embodiments, user profile data is stored in memory at a network location (e.g., at content source 132 or data sources 140, both of FIG. 1). Profile data may be retrieved from the network location and cached to the local user equipment upon logging into the user equipment, if desired.

The user may also select other criteria to include in the user's profile. Upon selecting other criteria button 712, a user may be presented with a list of optional profile criteria (not shown). Optional profile criteria may include other content attributes, such as ratings information, artist/actor information, director information, or any other suitable content information. For example, a user may prefer R and PG-13-rated content over G and PG-rated content. By adding "R" and "PG-13" to a favorite ratings list (similar to lists 702 and 704), a user may associate one or more preferred ratings with the user's profile. Similarly, other suitable information may be stored in the user's profile. For example, if the user loves the actor Tom Cruise, but dislikes the actor Jim Carey, a user may add Tom Cruise and Jim Carey to a favorite actors list and a least favorite actors list, respectively. Actor, artist, and director names may be retrieved from a suitable content or data source (e.g., content source 142 of FIG. 1).

The control circuitry may access the user profile data associated with user profile display 700 at any suitable time. For example, the control circuitry may read a user's profile data in anticipating a content surf landing channel. In determining which channels may be anticipated landing channels, the channel as well as the content currently be presented on the channel may be used to calculate an anticipation score for each channel (or a subset of channels), as described in more detail below. For example, if one of the user's favorite programs listed in favorite programs list 702 is being presented on channel 100, and the user is surfing up toward channel 100, the system may anticipate a landing channel of 100 (even if the actual landing channel was not 100).

To determine which channel or channels may be anticipated landing channels, an interactive application (such as an interactive media guidance application) may compute a weighted anticipation score for channels based on, at least in part, the user's profile data and the content currently being presented on the channel. This anticipation score may reflect how likely the user is to stop on that channel. For example, based on user profile data, anticipation scores of 22, 26, 31, 35, and 50 may be assigned to channels 21 through 25. Channel 25 may correspond to HBOE, which happens to be showing the Sopranos, the user's favorite program listed in favorite programs list 702. If channel 26 (HBOE) is also in the user's favorite channels list, this channel may be associated with a higher anticipation score than channels not showing one of the user's favorite programs (and not listed in the user's favorite channels list). This channel may be therefore classified as an anticipated landing channel for a given channel range. In one embodiment, anticipation scores may be assigned to channels using the equation:

$$AS = \sum_{i=1}^{N} w_i p_i \quad (EQ\ 1)$$

where N is the number of profile attributes used in the anticipation score (AS) calculation, $w_i$ is the weight (or rank) within the profile attribute, and $p_i$ represents the value of the profile attribute to the user. For example, if the user assigns a value of 10 to the favorite program profile attribute (i.e., $p_i=10$), then weights ($w_i$) may be assigned to the content within favorite programs list 702, depending on the content's position in the list. For example, a weight of 1 may be assigned to the first (favorite) entry in the list, a weight of 0.9 to the next (next favorite) entry in the list, etc. Therefore, if Sopranos is showing on a channel, that channel may receive 10 favorite program points, while a channel showing CSI-Miami may receive 9 favorite program points. The total anticipation score may be the sum of all the points derived from profile attributes currently in the user's profile.

Anticipation scores may also be derived, at least in part, from user history information or past interaction with the user equipment. The interactive media guidance application may store recent user history information in memory 234 (FIG. 2). This user history information may then be used to augment a channel's anticipation score. For example, content on channels that the user has previously paused on during a recent content surf may be credited anticipation score points based on, for example, the duration of the user's pause on that content or channel. Anticipation score points may also be credited based on other criteria. Channels showing content that the user has recently watched, or obtained more information on (e.g., the user recently accessed the content's description or program information), may be credited with anticipation score points. Channels showing content that the user has added to one or more "watch lists" or set one or more notification alerts for may also be credited with anticipation score points, if desired. Finally, channels showing content that the user has recently recorded (or set a recording reminder for) may also be credited with anticipation score points. In this way, a channel's total anticipation score may be based on user profile data and user history information.

In some embodiments, anticipation scores may be dynamically adjusted during a content surf. For example, a channel's anticipation score may also be a function of the user's current distance from the channel in a content surf. For example, even though channel 25 may be associated with an anticipation score of 50, this channel may not be the user's desired landing channel depending on how far away from channel 25 the user is at the conclusion of a content surf. Accordingly, anticipation scores may be dynamically adjusted as the user's surf progresses. The anticipation score associated with channel 25 may decrease as the user surfs farther away from channel 25 and increase as the user surfs closer to channel 25. In some embodiments, the rate of decrease (i.e., penalty) or increase (i.e., benefit) may be linear or quadratic and may be set by the user, if desired.

In addition, in some embodiments, a maximum channel range may be associated with each anticipation score. If the user surfs beyond the maximum channel range, the anticipated landing channel may be removed from the list of possible anticipated landing channels (e.g., the anticipation score may be reduced to 0). The maximum channel range may be fixed for all anticipation scores or a function of the value of the anticipation score. Thus, higher anticipation scores may be associated with larger maximum channel ranges than lower anticipation scores. In the example above, the channel associated with the anticipation score of 50 may be assigned a maximum channel range of 20, while the channel associated with the anticipation score of 22 may be assigned a maximum channel range of 5.

Figure 8:
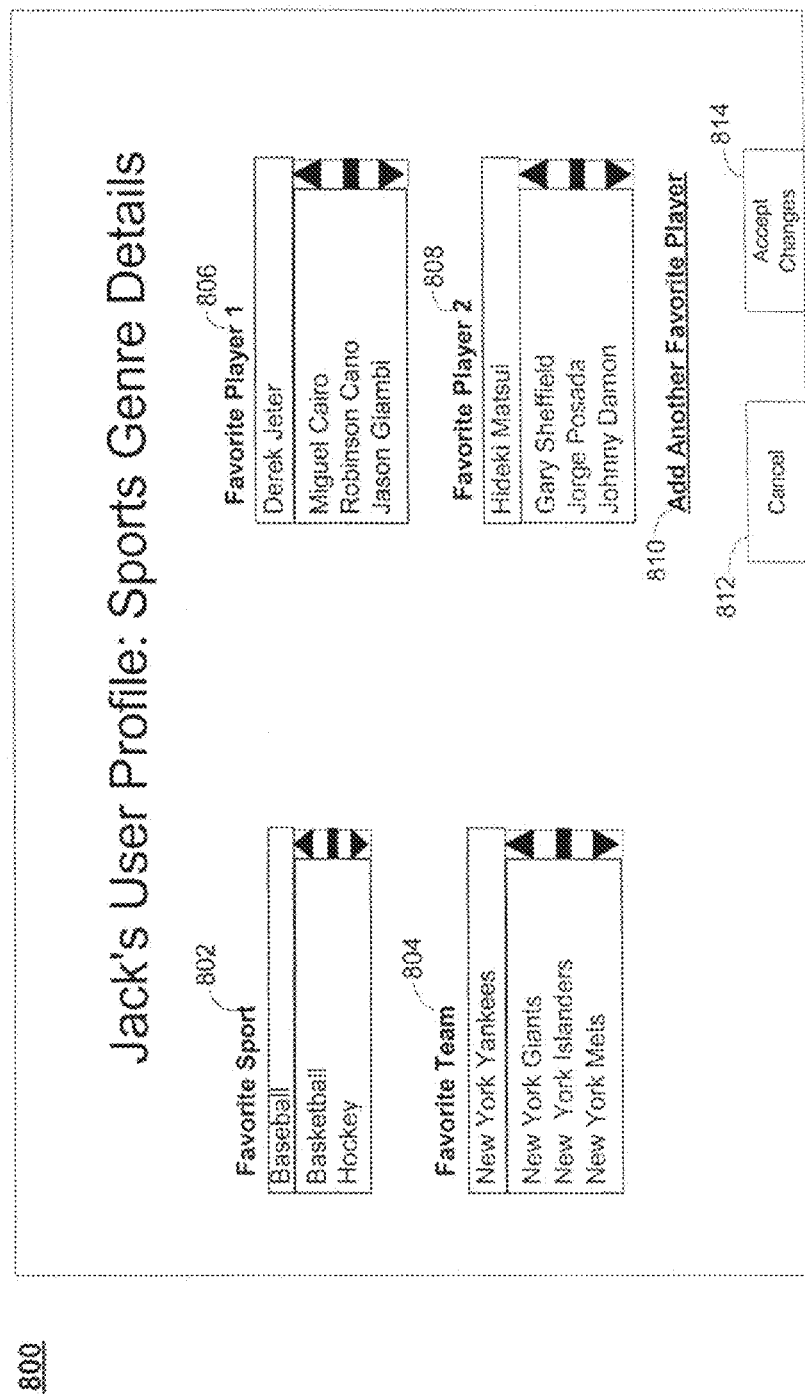
FIG. 8 shows an illustrative user profile genre details display and setup screen in accordance with the present invention.

If genre details are enabled, the interactive media guidance application may also use any genre details in the user's profile to calculate anticipation scores. For example, as shown in FIG. 8, genre details display screen 800 may include more information about a particular genre included in the user's favorite genre list. The example of FIG. 8 displays a sports genre detail display screen. However, other genre details may be provided. For example, a music genre display screen (not shown) may allow the user to define a favorite musical artist, music video choreographer, or any other suitable information. This information may be saved with the user's profile.

Genre details display screen 800 may include common details for the sports genre. In favorite sport selection 802, the user may define one or more favorite sports. In favorite team selection 804, the user may define one or more favorite teams. In favorite player selections 806 and 808, the user may define one or more favorite players. In some embodiments, favorite player selections 806 and 808 list the players associated with the team selected in favorite team selection 804. In other embodiments, all players, regardless of what team they are on, are listed in favorite player selections 806 and 808. The user may add additional players (from the same or different teams) by selecting add player link 810.

In order to populate the selections in display screen 800, including favorite sport selection 802, favorite team selection 804, and favorite player selections 806 and 808, the interactive media guidance application may access up-to-date team roster information from a suitable genre detail data source (e.g., data source 142 of FIG. 1). The interactive media guidance application may then use the user selections in genre details display screen 800 to augment the user's profile data. Similar to the selections in user profile display screen 700 (FIG. 7), weights may be assigned to the selections in genre details display screen 800. These weights may then be used by the interactive media guidance application to calculate channel anticipation scores using EQ. 1. A channel's anticipation score may be indicative of how interested the user would be in accessing the content on the channel.

Anticipation scores may also be used to suggest content to the user. In some embodiments, as the user content surfs, suggestions of content that may be of interest to the user (and are currently or shortly accessible by the user equipment) are presented to the user. Content of interest may include content on channels with high anticipation scores. For example, if the user is a CSI fan (based on prior profiling, such as the inclusion of CSI in favorite programs list 702 (FIG. 7)), the interactive media guidance application may consult a category or genre database that looks for any accessible content that is in the same category or genre as CSI. Currently accessible content may include programs, movies, and sporting events that are currently being broadcast on one or channels, starting within some user or system-defined time (e.g., 30 minutes), content available on-demand, and content available on one or more of the user's attached recording devices (such as recording device 260). A listing of content of interest may be presented in a non-obtrusive manner to the user, such as quick menu 902 of FIG. 9 (described in more detail below).

In the example of FIG. 8, the user has selected "baseball" as the user's favorite sport and "New York Yankees" as the user's favorite team. Therefore, if a user initiates a content surf while a New York Yankees baseball game is currently accessible (or about to be accessible, for example, on the YES network), the interactive media guidance application may add a link to this game in a content suggestions menu. Interactive media guidance application data from a suitable data source may be used to determine which channels are currently presenting content matching the genre detail.

Figure 9:
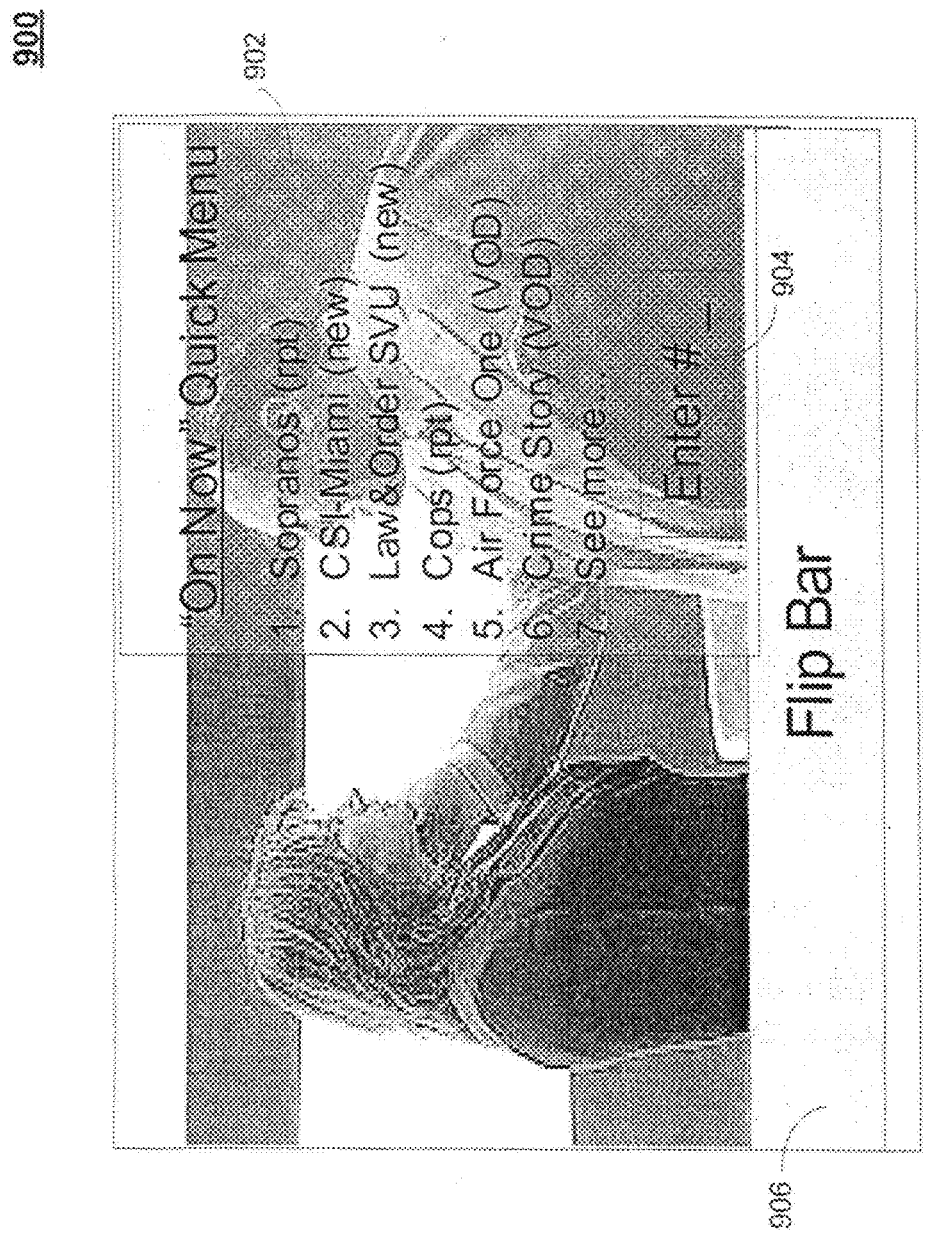
FIG. 9 shows an illustrative surf display screen with a content suggestions menu in accordance with the present invention.

As shown in FIG. 9, display screen 900 may include a content suggestions menu, such as quick menu 902. In some embodiments, quick menu 902 is presented after the user has been content surfing for a user or system-specified period of time. The presentation of quick menu 902 may not interfere with the content surf. Thus, the user may be allowed to continue surfing to new channels or content while quick menu 902 is displayed. Quick menu 902 may include one or more quick dial content listings of interest, each associated with a quick dial number and, optionally, a status indicator. Status indicators may include "new," "repeat," the source of the content (e.g., "VOD" or "DVR"), or any other suitable information. The user may enter any quick dial number displayed in quick menu 902 and be tuned directly to the content associated with the quick dial number. Quick dial numbers may be entered into quick dial entry 904. Alternatively, the actual channel numbers associated with the content displayed in quick menu 902 may be used as the content's quick dial number and entered into quick dial entry 904. In some embodiments, quick menu 902 may time out after the user pauses his surfing for a specified period of time.

In some embodiments, when a user presses a quick dial number on a user input device while quick menu 902 is displayed, more information about the program corresponding to the quick dial number is displayed in flip bar area 906. For example, the content start and end time (if applicable), the content rating, a content description, or any other suitable information may be presented to the user.

In one or more embodiments, programs may be promoted or advertised in quick menu 902. For example, the programs suggested in quick menu 902 may be determined, at least in part, as a function of those programs that the cable or multiple service operator (MSO) wants to promote. The promotion may be part of a business model wherein the operator collects additional fees or revenue from the associated networks based on a desired level of promotion. For example, the FOX network may wish to aggressively promote one or more new television series. These series may be displayed higher (or otherwise more prominently) in quick menu 902 to help increase visibility (and user selection). Additionally, some graphic or other attention-grabbing icon or indicator may be displayed next to the content name, if desired. For example, a thumbnail icon of the content or a star icon may be positioned next to the content name in quick menu 902.

In some embodiments, quick menu 902 may also be combined with skip mode. For example, rather than present a still frame or video as a user surfs through content, the control circuitry (or interactive media guidance application) may determine in advance content of interest to the user in the forward direction of the content surf. The skip value (i.e., the value of N as described above) may be dynamically adjusted to skip to the next channel or content of interest. For example, assuming that based on the user's profile data (e.g., favorite genres list 704 of FIG. 7) the user is interested in the sports and music genres, then the value of N could be adjusted dynamically so that only sports and music channels (or channels currently presenting sports or music content) are tuned. For example, if the channels MTV and VH1 correspond to channels 44 and 45, respectively, and the channels ESPN and CBS (which happens to be airing a basketball game at the time of surfing) correspond to channels 81 and 123, respectively, the channel skip value may be adjusted to land on these channels. So, for example, if the user then starts to surf down from channel 150, rather than presenting a still frame of video, the control circuitry may pipeline tune to channels 123, 81, 45, and 44.

In addition to using profile data to dynamically adjust the value of N, information associated with the content being presented on the user equipment just prior to the content surf may be used. For example, if the user was watching a basketball game prior to initiating a surf, then the sports genre may automatically be added to the search criteria. Additionally or alternatively, the sports genre detail may be automatically created to add basketball to the user's favorite sport in favorite sport list 802 (FIG. 8). In this way, a user may quickly tune to other similar assets accessible by the user equipment without navigating to the full interactive media guidance grid.

In some embodiments, while the user is content surfing, locally stored text or graphic advertisements may be overlaid on the screen. These advertisement overlays may be presented by themselves or in combination with the hints or content suggestions, described above. In some embodiments, advertisements may replace parts of flip bar area 906. In other embodiments, the advertisements may be shown in the main display window while the user content surfs. While advertisements are being displayed, the user may retrieve one or more pages of additional information related to the advertisement by selecting an "Info" button on user input device 220 (FIG. 2). Links to order entry forms and purchase information may also be provided.

For example, a hyperlink to a webpage may be included in flip bar area 906. If the user is interested in obtaining more information about the advertisement, the user may select the hyperlink and directly access additional information. The user may also press a "Save" button on user input device 220 to cache a copy of advertisements of interest to the user's personal space (e.g., the user's personal directory) on the user equipment. This way, the user may view the advertisement at a later time in more detail. Alternatively or additionally, upon pressing the "Save" button while an advertisement is being displayed, the user equipment may automatically record a video related to the advertisement to memory 234 (FIG. 2). The user may then access the video at a later time.

In combination with one or more of the previous embodiments, audio, either associated with specific programs of interest that are skip-tuned, audio that is used to train or provide hints of programs of interest to the user based on the user's profile, or audio associated with advertisements that have been locally stored, may be played while content surfing. The audio may include digital music selections and compilations (e.g., in MP3 format). In addition, the audio may include user audio selections that the user has transferred to the user equipment (or an attached storage or recording device). For example, digital audio clips from a digital audio player may be transferred to the user equipment and custom audio may be played. As another example, instead of transferring the audio content to the user equipment, the content may be played or streamed directly from an attached (or coupled) digital audio device or player.

Figure 10:
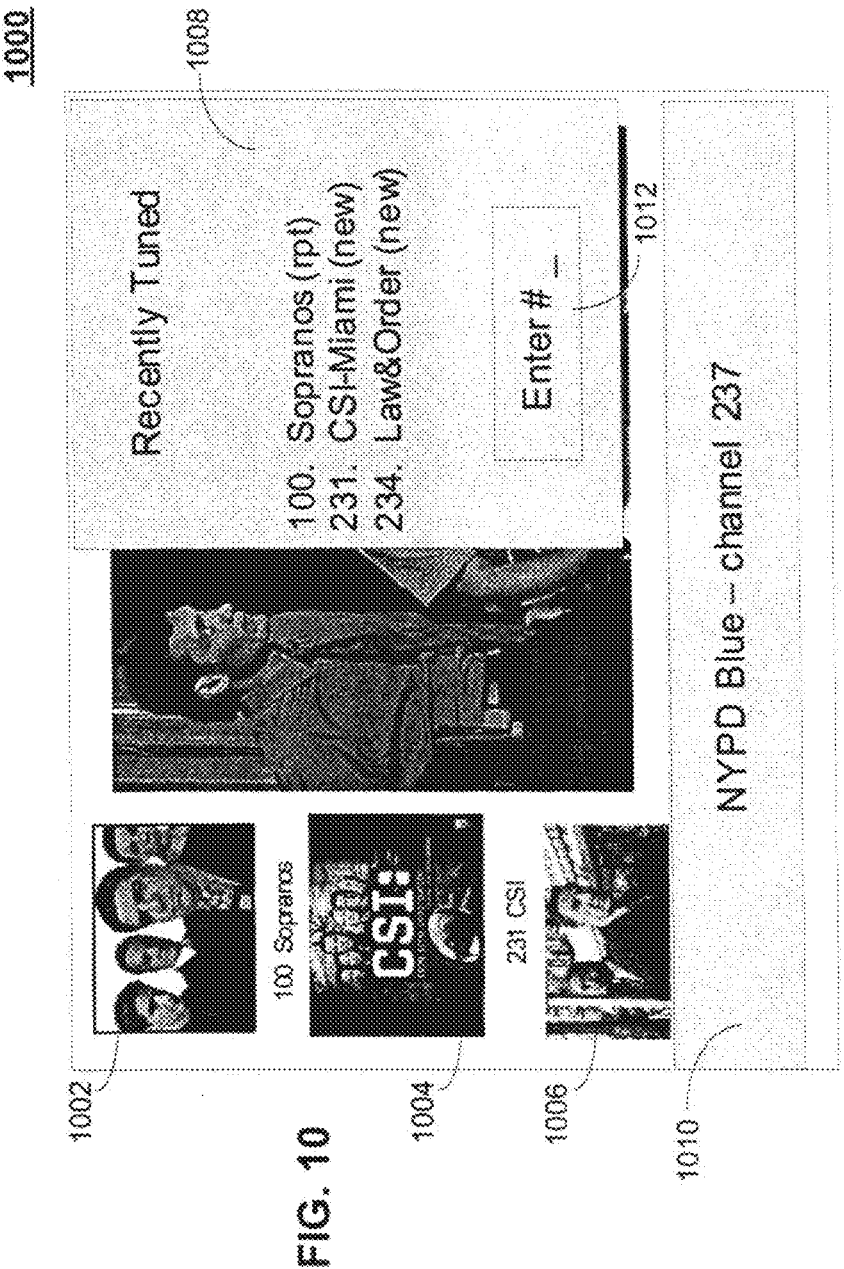
FIG. 10 shows an illustrative surf display screen with a recently tuned content overlay and content thumbnail windows in accordance with the present invention.

Since a user may pause briefly on multiple channels or content during a content surf, in some embodiments, a visual representation of where the user has paused may be presented to the user. As shown in FIG. 10, this visual representation may include a thumbnail window of each recently paused on channel or content during the current content surf. Thumbnail windows 1002, 1004, and 1006 may represent the user's last three paused on channels or content. In the example of FIG. 10, this content corresponds to channel 100, channel 231, and channel 234. Thumbnail windows 1002, 1004, and 1006 may include one or more still frames, still graphics, animated graphics (e.g., animated gifs) or video loops of the paused on content. The still frames or graphics may be the same one or more frames stored in memory on the user equipment while implementing the pipeline tuning sequence or even a video loop created from the stored frames.

In creating thumbnail windows 1002, 1004, and 1006, graphics circuitry 250 (FIG. 2) may reduce the native size or resolution of any of the tuner inputs (or other content, such as one or more frames of video stored on the user equipment), and present this scaled output on display screen 1000. The user may then enter a channel number (or quick dial number) associated with the thumbnail window or select the thumbnail itself to terminate the surf and tune to the associated channel or content. In some embodiments, to save memory, the frames are resolution reduced and then recompressed using an alternative high compression algorithm (e.g., MPEG-4 part 10) and then decompressed and displayed on the fly concurrently with the other "previously accessed" content windows. In some embodiments, the visual representation of the user's most recently paused on channels or content may not interfere with the user's content surf. Thumbnail windows 1002, 1004, and 1006 may be presented in a grid with or without brief descriptions of each thumbnail (e.g., the name of the content, the associated channel number, the quick dial number, or any other suitable information).

In some embodiments, rather than displaying a frozen image or frame of the most recently paused on content, while a user is content surfing the tuner may persist on the most recently paused on content, tuning to the next content or channel only when the user next pauses the surf. In these embodiments, live video corresponding to the previously tuned (or paused on) content may be presented in the background as the user surfs and until the user pauses again. If more than one tuner is available in the user equipment, the last N previously tuned content or channels may be displayed in live video. Display screen 1000 may include some indication that the video presently being displayed is previously tuned content. For example, the video may be reduced in size, brightness, or resolution. Additionally or alternatively, flip bar area 1010 may continue to be updated as the user's content surf progresses while the previously tuned video is displayed in thumbnail windows 1002, 1004, and 1006.

As shown in the example of FIG. 10, the user may have paused on channel 100, channel 231, and channel 234. The user may be currently paused on channel 237, which is reflected by the information in flip bar area 1010. Recently tuned menu 1008 may display a listing of the content or channels the user has previously paused on, along with the channel or quick dial number associated with the content. The user may enter the virtual channel or quick dial number into menu entry 1012 or select one of thumbnail windows 1002, 1004, and 1006 to terminate the surf and be tuned directly to the appropriate content. After some timeout period, both recently tuned menu 1008 as well as thumbnail windows 1002, 1004, and 1006 may disappear (optionally to be presented again, if desired, in the future) and the user may be returned to full screen video mode (with or without flip bar 1010, having its own timeout).

In some embodiments, instead of showing recently paused on content in thumbnail windows 1002, 1004, and 1006, these windows may present content suggestions or content of interest to the user. These embodiments may be considered a visual version of quick menu 902 (FIG. 9) where the suggested content is displayed as a video loop or one or more still frames instead of in a suggestion menu. Thumbnail windows 1002, 1004, and 1006 may be populated in the direction of the content surf, as the user surfs past a suggested channel, or in advance or reaching a suggested channel. In some embodiments, the thumbnails may additionally or alternatively include jacket art associated with the suggested content, if such jacket art is available from a suitable data or content source (e.g., content source 130 or data source 142 of FIG. 1).

Figure 11:
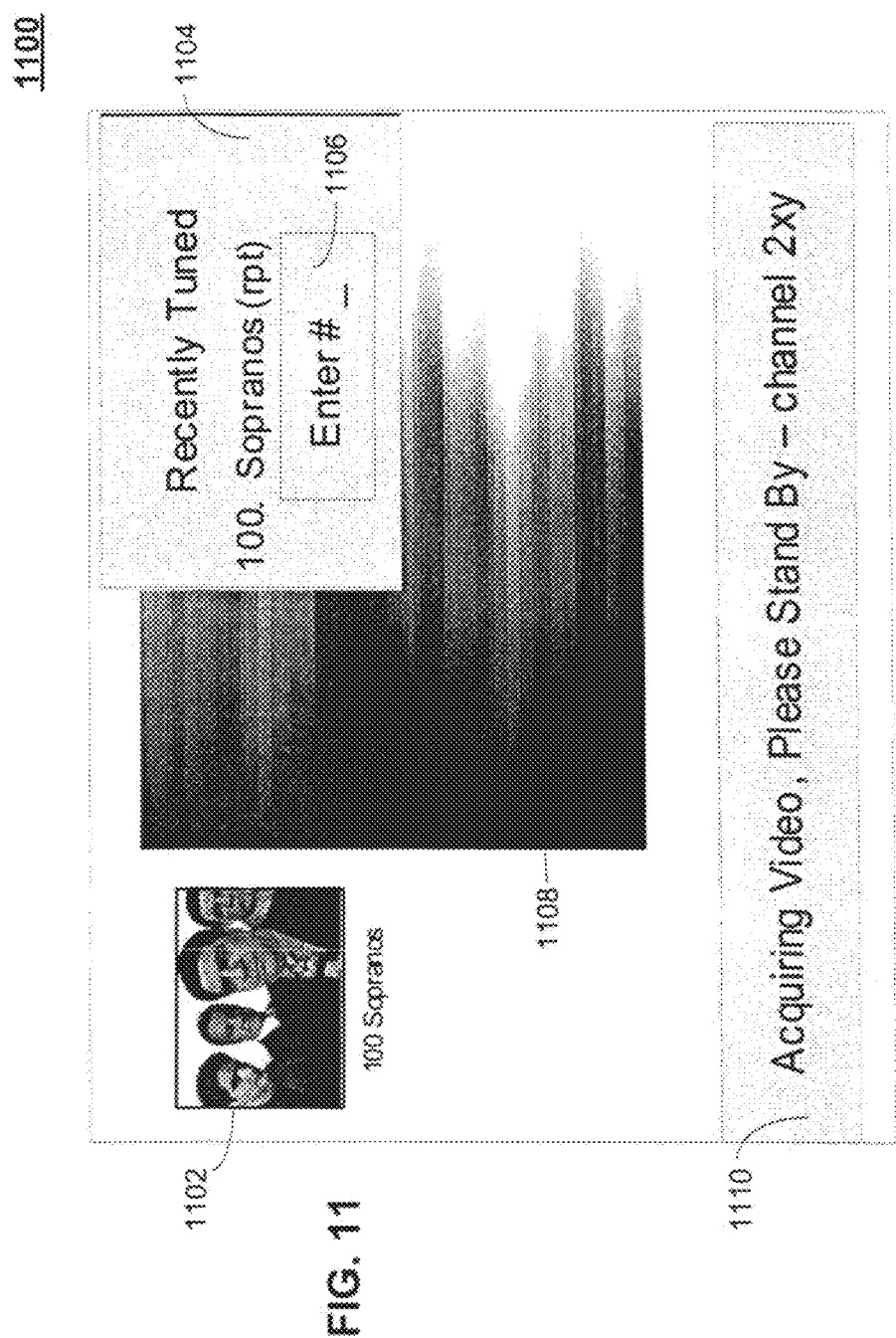
FIG. 11 shows an illustrative surf display screen with a recently tuned content overlay and content tuning message in accordance with the present invention.

FIG. 11 shows illustrative display screen 1100 in which a user has initiated a content surf in accordance with one embodiment of the invention. Upon initiating a content surf, the content the user was watching before the surf was initiated may change to reflect that the content is now historical (though it may still be tuned and playing live). For example, in thumbnail window 1102 the Sopranos on channel 100 has been moved to small thumbnail window 1102, but continues to play. Main video window 1108 may emulate a fast surfing or tuning action. Recently tuned menu 1104, which may include recently tuned menu entry 1106, may be populated with an entry for each recently tuned content or channel during the current content surf. The video from channel 100 may be displayed until the user pauses the content surf on a new channel or content, at which time main video window 1108 may fill with video from the newly paused on channel (e.g., channel 231). While the video is being acquired, content tuning message 1110 may be displayed to the user. This message may indicate to the user that main video window 1108 will present the newly paused on channel shortly. In one tuner systems, thumbnail window 1102 may then freeze since the user is tuned away. In multiple tuner systems, thumbnail window 1102 may continue to display full motion video. If the user starts to surf again within a user or system-selected time period, the motion video window from channel 231 may move into position in a thumbnail size under thumbnail window 1102 and continue playing until the user again pauses, at which time it may also freeze. This process may continue until the user exits or terminates the content surf (e.g., by pressing a "cancel" button on a user input device or waiting a user or system-specified surf timeout period).

In systems with more than one tuner, the tuners may be used in a round-robin fashion so that a number of most recently tuned (or paused on) channels up to the number of tuners present in the user equipment are displayed simultaneously in full motion video. For example, in display screen 1000 (FIG. 10), tuners 1 through 3 may be tuned to recently tuned channels 100, 231, and 234, which are displayed in thumbnail windows 1002, 1004, and 1006, respectively, in full motion video. A fourth tuner may be tuned to the currently paused on channel (e.g., virtual channel 237), which may appear in the large main video window. In this way, each tuner may be displaying motion video as opposed to one or more frames or a pre-stored video clip. If only three tuners are available, either the number of recently viewed windows may be reduced or the oldest of the recently viewed windows can be filled with a still or graphic as described earlier.

Figure 12:
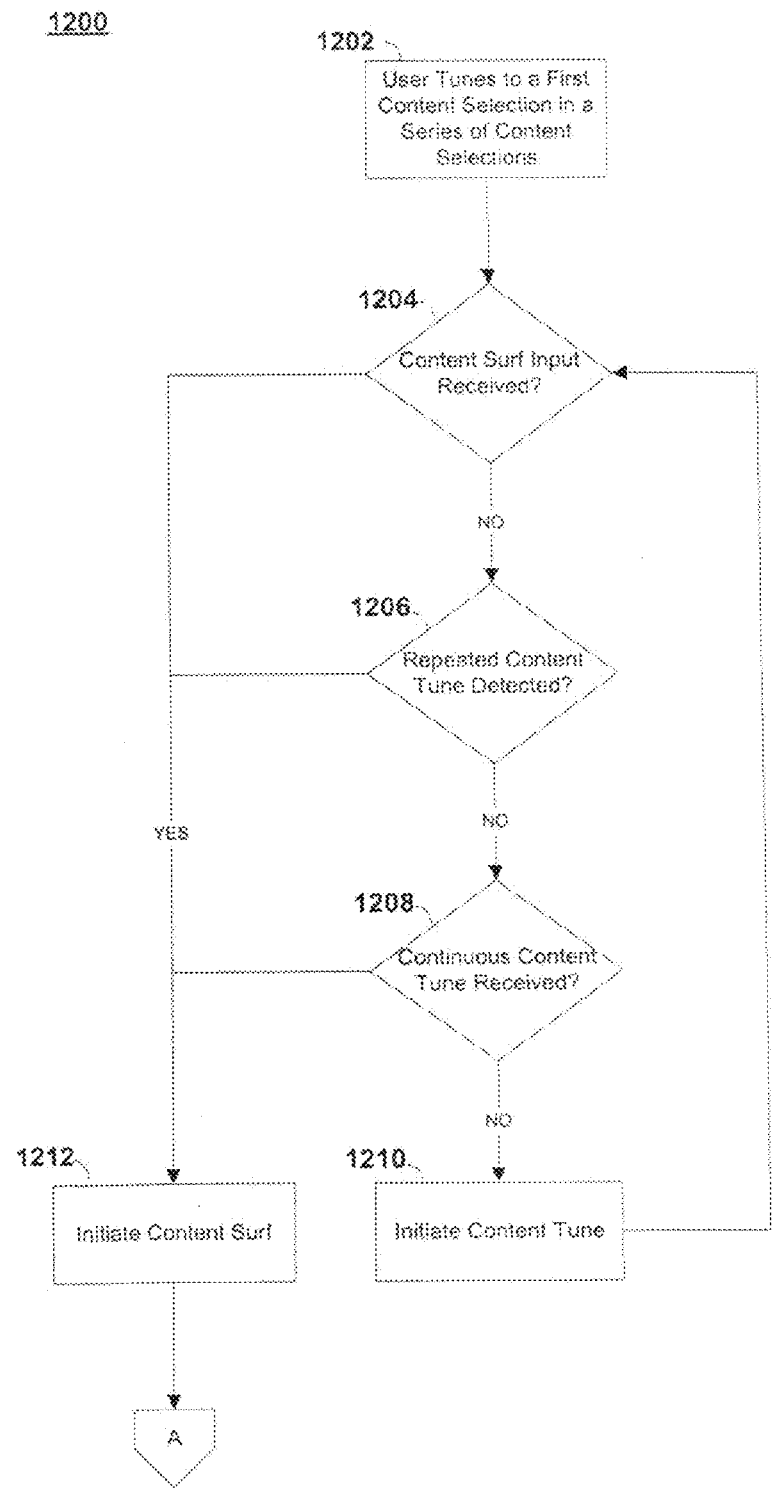
FIG. 12 is a flow chart depicting an illustrative process for detecting a content surf request in accordance with the present invention.

FIG. 12 shows illustrative process 1200 for detecting a content surf. As described above, content surfs may be initiated in a number of ways. At step 1202, the user may tune to a first content selection in a series of content selections. For example, the user may tune to a broadcast television or on-demand channel. The user may also access a content selection stored on an attached recording device, such as recording device 260 (FIG. 2). At decision 1204, control circuitry 230 (FIG. 2) may determine if an explicit content surf input has been received. An explicit content surf may include a user selection of a "content surf up" or "content surf down" button on user input device 220 (FIG. 2), for example. If the control circuitry does not detect an explicit content surf request at decision 1204, the control circuitry may determine if the user has repeatedly requested a content tune at decision 1206. For example, the user may repeatedly press a traditional channel up or channel down button on user input device 220 (FIG. 2) for a system-defined threshold period of time. For example, after repeatedly pressing a traditional channel up or channel down button for 10 seconds, control circuitry 230 (FIG. 2) may determine that a content surf was requested at decision 1206. If the control circuitry does not detect a repeated content tune, at decision 1208 control circuitry 230 (FIG. 2) may determine if a continuous content tune request has been received. A continuous content tune request may include, for example, pressing (and holding) a traditional channel up or channel down button on user input device 220 (FIG. 2) for a system-defined threshold period of time.

If, at decision 1208, it is determined that the control circuitry has not received a continuous content tune request, control circuitry 230 (FIG. 2) may initiate a traditional content tune at step 1210. If, on the other hand, the control circuitry detects any of the events associated with decisions 1204, 1206, and 1208, the control circuitry may initiate a content surf at step 1212.

In practice, one or more steps shown in process 1200 may be combined with other steps, performed in any suitable order, performed in parallel (e.g., simultaneously or substantially simultaneously), or skipped. For example, decisions 1204, 1206, and 1208 may be performed simultaneously, or combined into a single decision.

Figure 13:
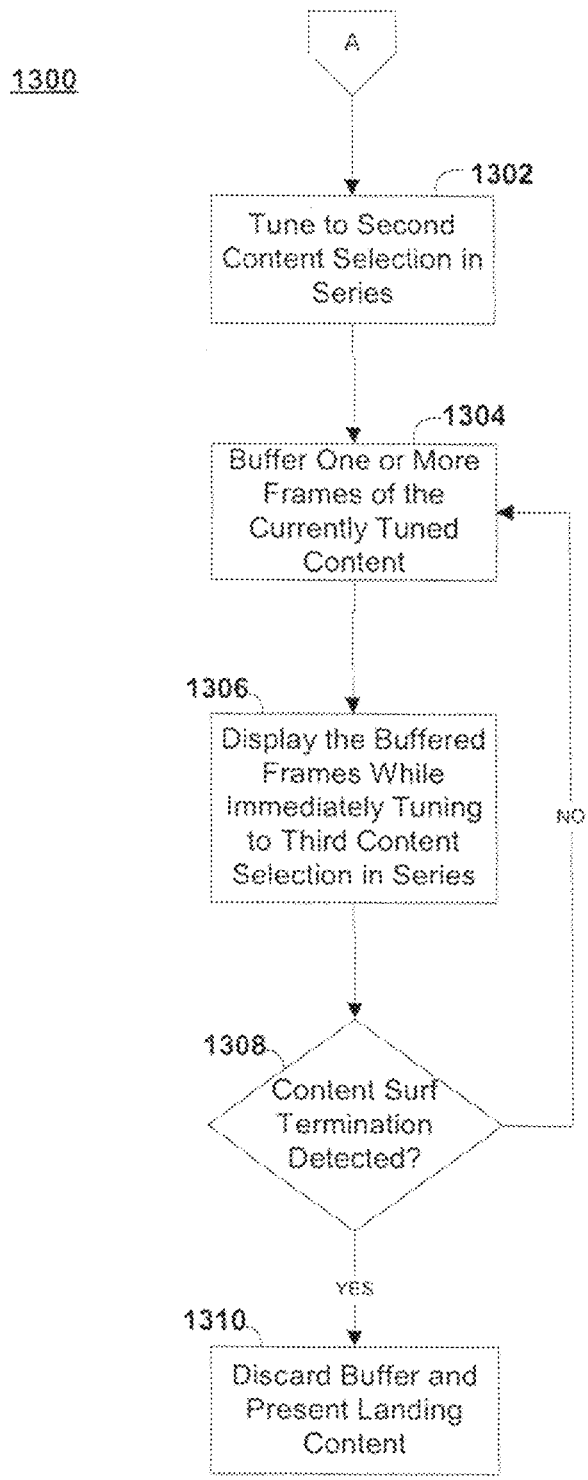
FIG. 13 is a flow chart depicting an illustrative process for pipeline tuning in accordance with the present invention.

FIG. 13 shows illustrative process 1300 for content surfing. After a content surf request has been detected, control circuitry 230 (FIG. 2) may direct a tuner (e.g., tuner 210 of FIG. 2) to tune to the next (e.g., the second) content selection in the series at step 1302. The next content selection in the series may include the next available channel in the direction of the content surf. For example, if a user is content surfing up from channel 24 ABC, tuner 210 (FIG. 2) may tune to channel 25 NBC. As another example, if a user is currently accessing content from an attached recording device (e.g., on recording device 260 (FIG. 2)), the next content selection may include, for example, the next content in alphabetical order (by file name or content name) or the content stored in the next physical location on the recording device.

After the second content selection has been tuned at step 1302, one or more frames of the second content may be buffered at step 1304. Buffering frames of content may include caching or saving these frames to memory 234 (FIG. 2). After buffering the one or more frames of content at step 1304, control circuitry 230 (FIG. 2) may direct tuner 210 (FIG. 2) to tune to the third content in the series, at step 1306, while the one or more buffered frames of the second content are simultaneously displayed on display device 240 (FIG. 2). At decision 1308, the control circuitry may determine if the user has terminated the surf request. If so, the buffered frames may be discarded and the landing content of the surf may be presented to the user at step 1310.

If, at decision 1308, the control circuitry still detects a channel surf request, the channel surfing process may return to step 1304. The control circuitry may then buffer one or more frames of the next (e.g., third) content. This process may continue until the content surf is terminated.

In practice, one or more steps shown in process 1300 may be combined with other steps, performed in any suitable order, performed in parallel (e.g., simultaneously or substantially simultaneously), or skipped.

Figure 14:
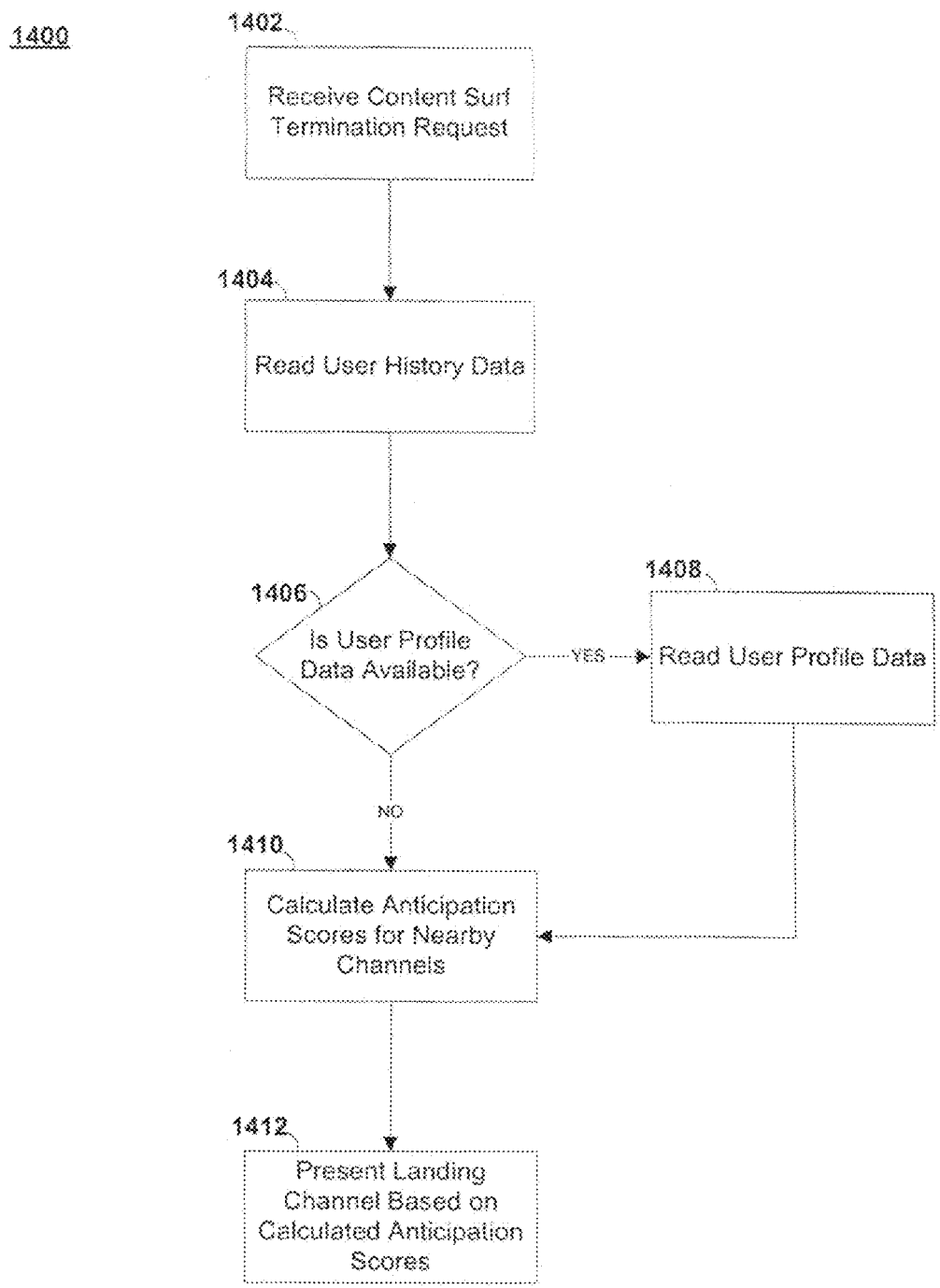
FIG. 14 is a flow chart depicting an illustrative process for anticipating a user's landing channel at the conclusion of a content surf in accordance with the present invention.

FIG. 14 shows illustrative process 1400 for selecting an anticipated landing channel of a content surf. At step 1402, a content surf request may be received. For example, the user may have selected to content surf using user input device 220 (FIG. 2). At step 1404, user history data may be read from memory 234 (FIG. 2). For example, user history may include content or channels that the user has recently paused on, watched, ordered (e.g., via an on-demand or pay-per-view (PPV) ordering process), recorded, set an alert for, or any other suitable user interaction with the user equipment. At decision 1406, the control circuitry may determine if user profile data is available. The control circuitry may determine if user profile data is available by searching a profile directory in memory 234 (FIG. 2) for a user profile data file, for example. If profile data is available, the profile data is read at step 1408. For example, the user may have created favorite channel data using favorite channels display screen 600 (FIG. 6) or favorite genre or program data using user profile display screen 700 (FIG. 7).

After reading the user profile data at step 1408, or if no user profile data is available, anticipation scores may be calculated for a subset of the currently accessible channels at step 1410. The subset of channels may include channels within a pre-defined number of channels from the user's actual landing channel. For example, if the user actually issued the surf termination request at channel 210, anticipation scores may be calculated for channel within 10 channels of channel 210 (e.g., channels 200 through 220). Alternatively, anticipation scores may be calculated for all channels, if desired. Anticipation scores may be calculated using EQ 1. At step 1412, a landing channel may be tuned and displayed on display device 240 (FIG. 2) based on the anticipation scores calculate at step 1410. In some embodiments, this landing channel may be tuned and decoded in advance. For example, the channel with the greatest anticipation score may be presented to the user at step 1412, even though that channel was not the user's actual landing channel.

In practice, one or more steps shown in process 1400 may be combined with other steps, performed in any suitable order, performed in parallel (e.g., simultaneously or substantially simultaneously), or skipped. For example, user history data and user profile data may be stored as a single data source in memory 234 (FIG. 2). Steps 1404 and 1408 may then be combined into a single step, if desired.

Figure 15:
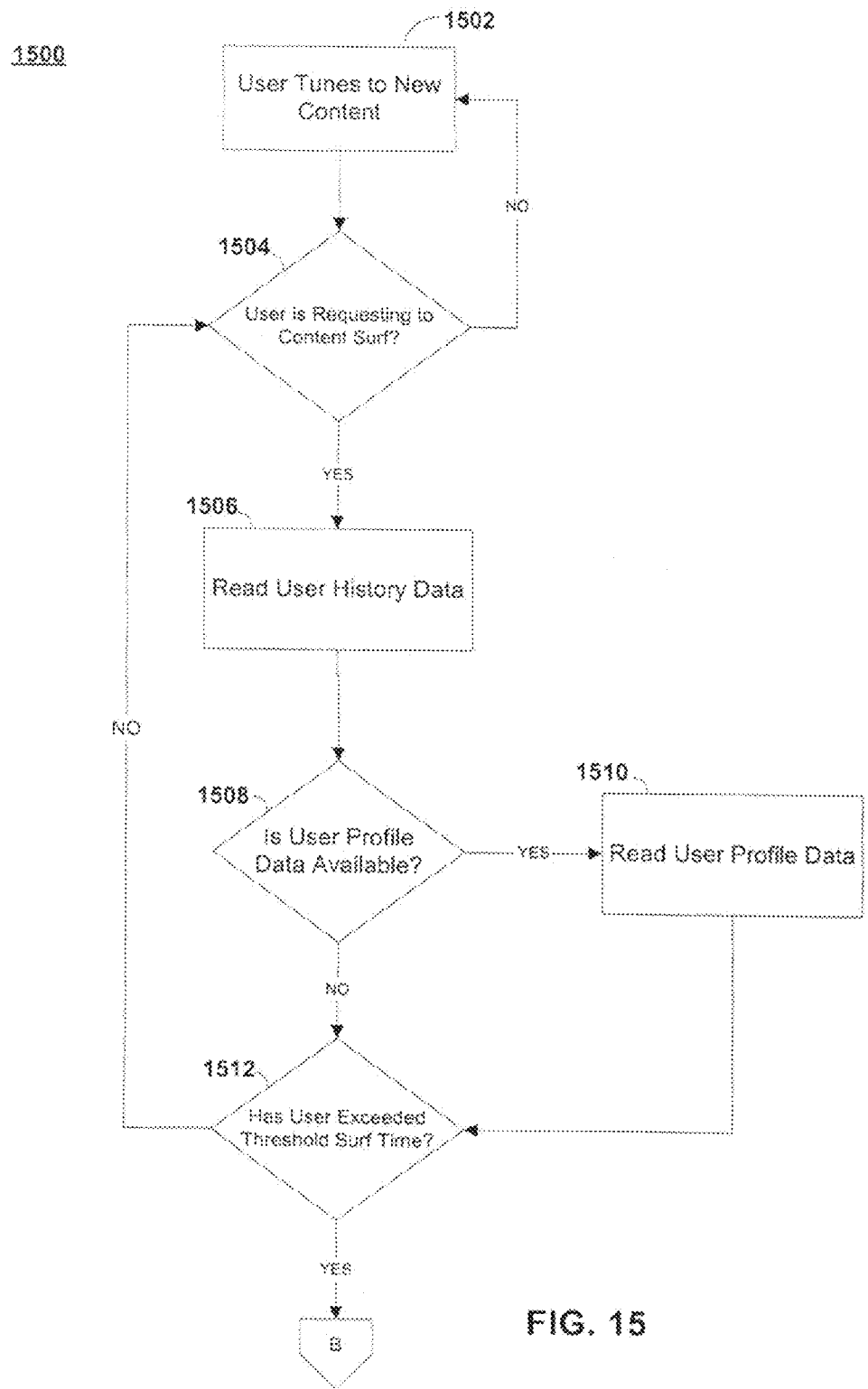
FIG. 15 is a flow chart depicting an illustrative process for preparing a content suggestions menu in accordance with the present invention.

FIG. 15 show illustrative process 1500 for preparing to present content suggestions to a user. At step 1502, the user may tune to new content. For example, the user may input, using user input device 220 (FIG. 2), a new channel number. Control circuitry 230 (FIG. 2) may receive the channel input from the user input device and direct tuner 210 (FIG. 2) to tune to the appropriate channel. The control circuitry may then display the tuned content on display device 240 (FIG. 2). At decision 1504, the control circuitry may determine if the user is requesting a content surf. For example, process 1200 (FIG. 12) may be used to determine if the user has requested a content surf. At step 1506, user history data may be read from memory 234 (FIG. 2). As previously described, user history data may include any recent user interaction with the user equipment.

At decision 1508, the control circuitry may determine if user profile data is available. The control circuitry may determine if user profile data is available by searching a profile directory in memory 234 (FIG. 2) for a user profile data file, for example. If user profile data is available, at step 1510, the user profile data may be read. After the user profile data has been read, or if no user profile data exists, control circuitry 230 (FIG. 2) may determine, at decision 1512, if the user's current content surf has exceeded some threshold surf time period. For example, if the current content surf has persisted for more 10 seconds, illustrative process 1500 may continue in FIG. 16 by presenting a content suggestions menu. If the control circuitry determines that the current content surf user has not exceeded the surf threshold time period, the surf may continue.

In practice, one or more steps shown in process 1500 may be combined with other steps, performed in any suitable order, performed in parallel (e.g., simultaneously or substantially simultaneously), or skipped.

Figure 16:
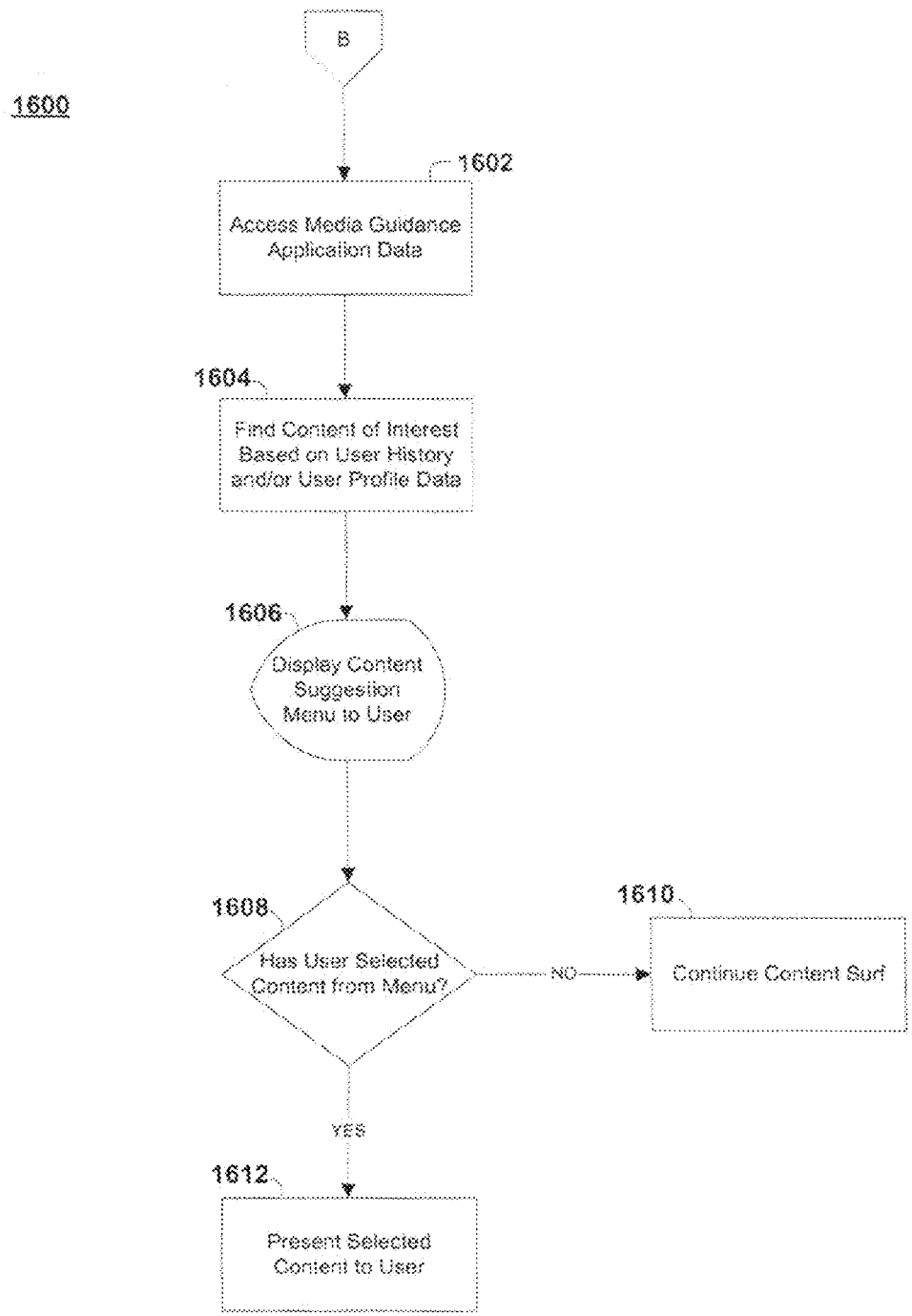
FIG. 16 is a flow chart depicting an illustrative process for presenting content suggestions to a user while content surfing in accordance with the present invention.

FIG. 16 shows illustrative process 1600 for presenting a content suggestion menu to the user. At step 1602, the media guidance application data may be accessed. For example, media guidance application data may include, for example, channel listings information, content descriptions, genre information, actor information, ratings information, director information, or any other suitable information associated with content currently accessible by user equipment 200 (FIG. 2) or available in the near future. For example, in one embodiment, control circuitry 230 (FIG. 2) may analyze media guidance application data associated with broadcast television content currently being broadcast or about to be broadcast within the next 30 minutes. As another example, media guidance application data associated with on-demand and recorded content may be accessed at step 1602.

At step 1604, the interactive media guidance application may locate content of particular interest to the user based, at least in part, on the user profile and/or user history data read at steps 1510 and 1506 (FIG. 15), respectively. Content may be located on any accessible channel or on an attached storage device (e.g., recording device 260 (FIG. 2)). Preferably, the interactive media guidance application uses the anticipation scores calculated in process 1400 of FIG. 14 to locate content of interest to the user. For example, while a user is content surfing, the interactive media guidance application may calculate anticipation scores and present the content associated with the top anticipation scores in a content suggestion listing at display 1606. The content listings in display 1606 should be of particular interest to the user, since the content was selected based on user history and user profile information. In some embodiments, display 1606 may correspond to quick menu 902 (FIG. 9).

The user may then be given an opportunity to select a content listing in display 1606. At decision 1608, the interactive media guidance application may determine if the user has selected to view content listed in display 1606. The user may select content in display 1606 by entering a quick dial number, a channel number, or highlighting and selecting the content listing itself. The user may interact with display 1606 using user input device 220 (FIG. 2). If the user has not selected to view content listed in display 1606, then the content surf may continue at 1610. Thus, display 1606 may not interfere with the current content surf. If the user has selected content from display 1606, the content may be presented on display device 240 (FIG. 2) at step 1612.

In practice, one or more steps shown in process 1600 may be combined with other steps, performed in any suitable order, performed in parallel (e.g., simultaneously or substantially simultaneously), or skipped.

Figure 17:
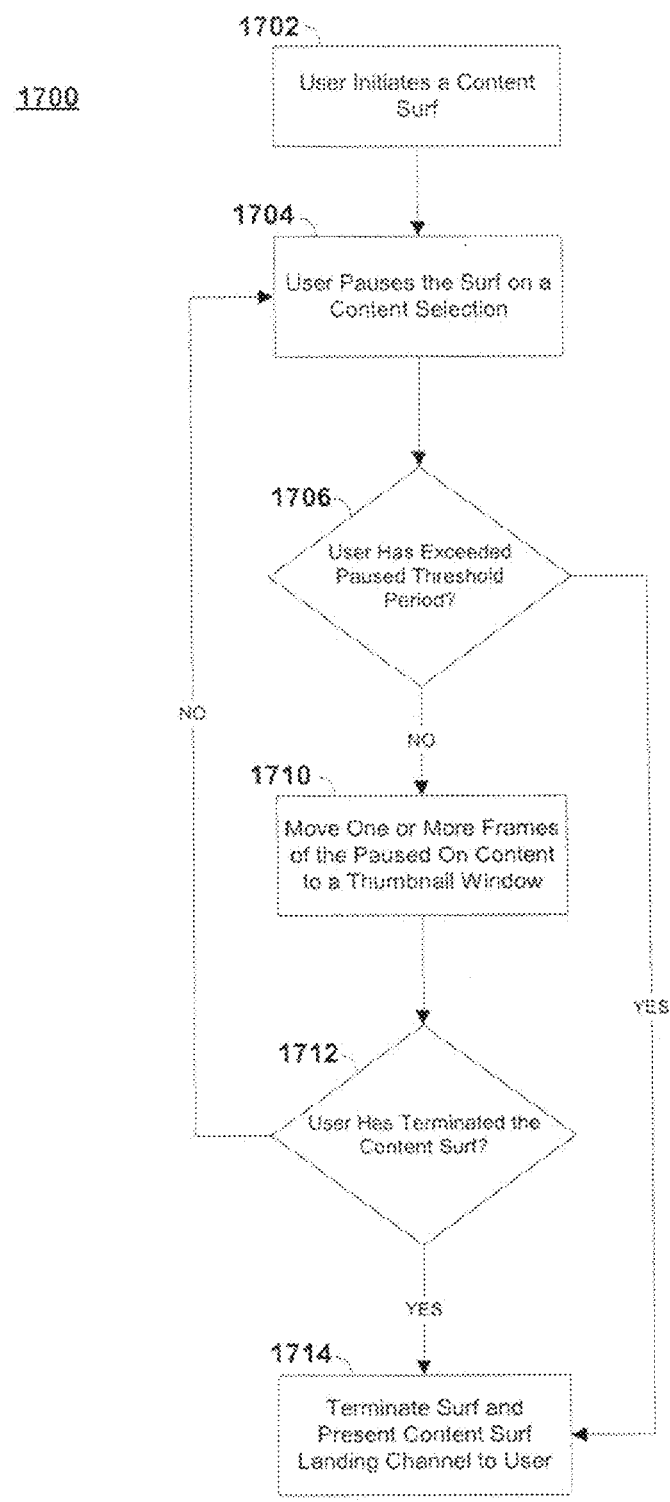
FIG. 17 is a flow chart depicting an illustrative process for presenting previously paused on content while content surfing in accordance with the present invention.

FIG. 17 shows illustrative process for presenting thumbnail windows of recently paused on content during a content surf. At step 1702, the user may initiate a content surf. The content surf may be detected using process 1200 (FIG. 12). At step 1704, the user may pause the surf on a content selection. For example, the user may release a channel up or down button on user input device 220 (FIG. 2). If the uses pauses for more than a threshold period of time at decision 1706, the content surf may be terminated and the user may be presented with the paused on content at step 1714.

If the user continues with the content surf after pausing on a content selection, the paused on content may be moved to a thumbnail window at step 1710. For example, the thumbnail window may correspond to thumbnail window 1102 (FIG. 11) or thumbnail windows 1002, 1004, or 1006 of FIG. 10. At decision 1712, the control circuitry may determine if the user has requested to terminate the content surf. For example, the user may terminate a content surf by selecting a thumbnail window, pressing a "cancel" button on user input device 220 (FIG. 2), or letting the timeout period elapse. If control circuitry 230 (FIG. 2) determines that the user still wishes to content surf, the user may continue the surf process and pause on one or more content selections. Each paused on content selection may be moved to a thumbnail window, as shown in FIG. 10.

In practice, one or more steps shown in process 1700 may be combined with other steps, performed in any suitable order, performed in parallel (e.g., simultaneously or substantially simultaneously), or skipped.

The above described embodiments of the invention are presented for purposes of illustration and not of limitation, and the present invention is limited only by the claims which follow.

What is claimed is:

1. A method for content surfing on user equipment, the method comprising:
   generating a sequential display in a first area, from a list of a plurality of content selections in a content surf, of the plurality of content selections;
   determining whether a user request to pause the content surf was received when a display is generated, in a second area, of a given one of the content selections;
   generating a content identifier of the given one of the content selections in response to determining that the user request to pause the content surf was received when the display was generated, in the second area, of the given one of the content selections; and
   updating the sequential display generated in the first area with another one of the plurality of content selections while maintaining the generated display of the given one of the content selections in the second area.

2. The method of claim 1, wherein the content identifier includes a content listing.

3. The method of claim 1, further comprising:
   generating a visual representation of the given one of the content selections corresponding to the content identifier.

4. The method of claim 1, further comprising:
   generating a display of the given one of the content selections corresponding to the content identifier.

5. The method of claim 1, further comprising:
receiving a user selection of the content identifier;
terminating the content surf responsive to the user selection; and
generating a display of the given one of the content selections corresponding to the selected content identifier.

6. The method of claim 1, wherein the plurality of content selections is determined based on user profile data.

7. The method of claim 1, wherein the content identifier is a first content identifier in a plurality of content identifiers, the method further comprising:
determining whether another user request to pause the content surf was received when a display is generated of another one of the content selections;
generating a second content identifier of the another one of the content selections in response to determining that the another user request to pause the content surf was received when the display was generated of the another one of the content selections; and
adding the second content identifier to the plurality of content identifiers.

8. The method of claim 1 further comprising preventing the generation of another content identifier corresponding to another content selection of the plurality of content selections if a user request to pause the content surf is not received when a display of the another content selection is generated.

9. A system for content surfing on user equipment, the system comprising:
control circuitry configured to:
generate a sequential display in a first area, from a list of a plurality of content selections in a content surf, of the plurality of content selections;
determine whether a user request to pause the content surf was received when a display is generated, in a second area, of a given one of the content selections;
generate a content identifier of the given one of the content selections in response to determining that the user request to pause the content surf was received when the display was generated, in the second area, of the given one of the content selections; and
update the sequential display generated in the first area with another one of the plurality of content selections while maintaining the generated display of the given one of the content selections in the second area.

10. The system of claim 9, wherein the content identifier includes a content listing.

11. The system of claim 9, wherein the control circuitry is further configured to:
generate a visual representation of the given one of the content selections corresponding to the content identifier.

12. The system of claim 9, wherein the control circuitry is further configured to:
generate a display of the given one of the content selections corresponding to the content identifier.

13. The system of claim 9, wherein the control circuitry is further configured to:
receive a user selection of the content identifier;
terminate the content surf responsive to the user selection; and
generate a display of the given one of the content selections corresponding to the selected content identifier.

14. The system of claim 9, wherein the plurality of content selections is determined based on user profile data.

15. The system of claim 9, wherein the content identifier is a first content identifier in a plurality of content identifiers and the control circuitry is further configured to:
determine whether another user request to pause the content surf was received when a display is generated of another one of the content selections;
generate a second content identifier of the another one of the content selections in response to determining that the another user request to pause the content surf was received when the display was generated of the another one of the content selections; and
add the second content identifier to the plurality of content identifiers.

16. The system of claim 9, wherein the control circuitry is further configured to:
prevent the generation of another content identifier corresponding to another content selection of the plurality of content selections if a user request to pause the content surf is not received when a display of the another content selection is generated.

* * * * *